(12) United States Patent
Holloway

(10) Patent No.: US 7,636,097 B1
(45) Date of Patent: Dec. 22, 2009

(54) METHODS AND APPARATUS FOR TRACING IMAGE DATA

(75) Inventor: David C. Holloway, San Francisco, CA (US)

(73) Assignee: Adobe Systems Incorporated, San Jose, CA (US)

( * ) Notice: Subject to any disclaimer, the term of this patent is extended or adjusted under 35 U.S.C. 154(b) by 433 days.

(21) Appl. No.: 11/354,427

(22) Filed: Feb. 15, 2006

(51) Int. Cl.
*G09G 5/00* (2006.01)
(52) U.S. Cl. .......................... 345/619; 345/611; 345/629
(58) Field of Classification Search .................. 345/603
See application file for complete search history.

(56) References Cited

U.S. PATENT DOCUMENTS

| | | | | |
|---|---|---|---|---|
| 5,428,728 | A * | 6/1995 | Lung et al. ................... | 345/469 |
| 5,515,179 | A * | 5/1996 | Yamakawa et al. ........... | 358/447 |
| 5,835,086 | A * | 11/1998 | Bradstreet et al. ........... | 345/581 |
| 6,324,300 | B1 * | 11/2001 | Doll ............................ | 382/162 |
| 6,753,862 | B1 * | 6/2004 | Miyasaka et al. ............ | 345/472 |
| 6,870,545 | B1 * | 3/2005 | Smith et al. .................. | 345/619 |
| 6,992,684 | B2 * | 1/2006 | Sanborn et al. .............. | 345/592 |
| 6,995,777 | B2 * | 2/2006 | Sanborn et al. .............. | 345/619 |
| 6,999,101 | B1 * | 2/2006 | Sanborn et al. .............. | 345/619 |
| 7,047,014 | B1 * | 5/2006 | Friday et al. ................. | 455/446 |
| 7,148,907 | B2 * | 12/2006 | Smith et al. .................. | 345/629 |
| 7,385,612 | B1 * | 6/2008 | Peterson ...................... | 345/619 |

\* cited by examiner

*Primary Examiner*—M Good Johnson
(74) *Attorney, Agent, or Firm*—Chapin IP Law, LLC; Barry W. Chapin, Esq.

(57) ABSTRACT

A system provides processes image data by obtaining a first image in a first data format such as a raster image. The system applies a tracing algorithm to the first image to produce a trace image of the first image. The trace image is maintained in a second data format such as a vector data format. The system displays, in an overlapping format, each of the first image in the first data format and the trace image in the second data format to allow the used to compare the differences between the two image formats. The system also provides a live trace feature that automatically applies changes to the first image in the first data format to the trace image.

19 Claims, 19 Drawing Sheets

METHODS AND APPARATUS FOR TRACING IMAGE DATA

BACKGROUND

Conventional computer systems operate software applications that assist users in the creative arts. Such software applications are commonly used to perform tasks for computer users such as graphic design, image processing and the like. Traditional software applications provide users with many tools to modify and enhance graphical and image data. Typically, a user performs image processing and design via a graphical user interface (GUI) comprising various windows, icons, buttons, dialogue boxes and the like, for the input, modification and output of data. For instance, a graphics software tool may change graphical and/or image data from one data format to another data format in order to enhance the quality and appearance of an image. As such, the user would have at his disposal the original image file in the first data format and the enhanced image file in the second data format.

Tracing algorithms are examples of features within such conventional software applications that enhance images by defining the edges of lines and shapes in an image and then rendering new lines and shapes to create a new image with smoother edges to provide a more streamlined appearance. Furthermore, a user may select from a myriad of options and parameters associated with the tracing algorithm application to control the outcome of the resultant image. Such tracing parameters may include modifying trace line thickness, applying trace blurring and other various tracing attributes. In some cases, tracing algorithms may convert graphical and/or image data from a raster format into a vector format as part of performing the image processing. Consequently, after applying a tracing algorithm to a raster image, a separate vector image file is created.

SUMMARY

Conventional technologies designed to perform tracing algorithm processing on image and/or graphical data suffer from a number of drawbacks. In particular, such technologies do not allow a user to concurrently view the original image data with resultant traced image data in the same application. For example, a user of such conventional technologies may be required to view the original image data in one computer application and subsequently execute a separate computer application or feature to view the traced image data, or vice versa. Such conventional applications that produce trace versions of an original image do not provide the ability to, for example, view the traced image in an overlapping manner concurrently with the original image. Accordingly, this type of conventional technology is not ideal for a user who may wish to concurrently view the original and traced images in an overlapping format in order to analyze the variations between the two images. For example, suppose a user created a digital image file comprising an image with multiple lines and shapes. The image may be a photograph or other image stored, for example, in a raster data format. Using conventional image processing software, a user may apply a tracing algorithm process to the digital image which would create a new traced image in a second image file. Typically, using such conventional software, the original image data is overwritten by the traced image data and thus the original raster image is no longer displayed in the GUI or present in the application. As a result, with conventional technologies a user would have to execute a second computer process (e.g., open a second GUI running the same application) and re-open the original raster image file to concurrently view and compare both the original image file and the traced image file. Furthermore, using conventional image processing software, both image files in such an example could not be placed atop one another, or in an overlapping format, which would allow a user to analyze in substantially real-time the variances between the original image and the traced image.

Furthermore, in order to sufficiently view and analyze two overlapping images, separate viewable configurations of each image are not available for viewing in conventional programs. For instance, conventional programs do not provide the ability to display a configuration of the traced image as an outline of the traced image, and to display the outline concurrently in an overlapping format with the original image. Thus, conventional technologies provide neither a method for displaying original and traced images in an overlapping format, nor do they provide any separate configurations of either the original image or the traced image for sufficiently viewing and analyzing the images.

Additionally, conventional tracing algorithm software does not allow a user to modify an image, either in the tracing algorithm application or in a concurrently executing image processing application, such that the tracing algorithm process automatically detects the modification and re-renders a traced image upon modification of the original image. In other words, conventional technologies do not allow a user to interactively modify and/or manipulate images in association with a tracing algorithm application. For example, suppose a user produces a traced image of an original digital image using a conventional tracing algorithm process and subsequently modifies the original image. Using conventional technologies, a user would have to edit and/or modify the original image in a separate software application and then re-initiate the tracing algorithm application to render a second traced image.

Furthermore, conventional technologies do not allow a user to save tracing algorithm parameters for use in a future application of the algorithm. For instance, after applying a tracing algorithm to an original image and then subsequently modifying the original image (either in the same or in a different application), a user of conventional software would have to reconfigure the tracing algorithm and manually apply the tracing algorithm to the modified image. This process can prove to be tedious and cause inconsistencies in successive applications of the tracing algorithm Embodiments of the tracing algorithm process disclosed herein are designed to overcome these drawbacks and provide users a system for interactively comparing, modifying and viewing images in an overlapping format. Generally, the system disclosed herein provides the ability for a user to concurrently view multiple configurations of digital images and their counterpart traced images. As will be discussed more fully herein, the system also provides mechanisms and techniques for interactively modifying images and tracing algorithm parameters on the fly without having to execute separate computer applications. For example, there may be times when a user would want to base a new drawing on an existing piece of artwork. More specifically, a user may want to create a digital graphic based on a pencil sketch drawn on a sheet of paper or a raster image saved, or created in, or from, another graphics program. In either case, the user could import the original graphic into a graphical editor application (e.g., Adobe Illustrator® manufactured by Adobe Systems, Inc. of San Jose, Calif., U.S.A.) by scanning the pencil sketched graphic into a raster data format and then by opening the raster image in the graphical editor.

In one embodiment of the system described herein, the graphical editor converts images in a first data format, such as raster images, into detailed traced versions in a second data format, such as a vector graphics format and displays the original and traced images in an overlapping manner so that they are both easy to edit, resize and manipulate without distortion. As a result, the amount of time it takes to recreate a scanned and traced drawing on-screen is reduced from days to minutes, or even seconds, without loss of quality and provides the ability, once the original image is traced, to immediately visually compare the two images (the original and the traced) to see how well the traced images matches the original. Furthermore, in another embodiment a user may interactively adjust the results of a traced image using a rich assortment of options including, but not limited to, preprocessing, tracing and overlay options. The interactive quality allows a user to adjust and manipulate digital images in real-time within a single executable computer application while comparing the original and traced versions.

More specifically, embodiments described herein provide a graphics process that obtains a first image in a first data format and applies a tracing algorithm to the first image to produce a trace image of the first image. In one configuration, the first image format is a raster format and the traced image format is a vector format. Furthermore, the system as discussed further displays, in an overlapping format, each of the first image in the first data format and the trace image in the second data format. For example, suppose a user creates a raster image and applies a tracing algorithm to the raster image to produce a traced image in a vector format. In such an instance, the system disclosed herein concurrently displays the raster image and the vector image in an overlapping format so that the user would be able to analyze the variations between the two images. Since the images are overlapping, the user can quickly see any deviations in the traced image from the original, as produced by the tracing algorithm, and can correct such distortions if required (by adjusting trace algorithm parameters).

The graphics process includes a first image configuration selector indicating a plurality of selectable first image configurations applicable to the first image. This allows the first image, such as the original raster image, to be viewed in a variety of different formats. As such, a user may select a particular first image configuration to view in conjunction with the traced image. The first image configurations include, but are not limited to, a transparent configuration, an adjusted configuration and the like. For example, a user may select to view a transparent configuration of the first image whereby the first image is shown in a transparent state in an overlapping format with the traced image.

The graphics process also includes a traced image configuration selector indicating a plurality of selectable traced image configurations applicable to the traced image. This allows the user to view resultant traced image in a number of different formats as well. As such, a user may select a particular traced image configuration to view in conjunction with the first image, or any first image configuration thereof. The traced image configurations include, but are not limited to, an outlined configuration, a transparent with outlines configuration and the like. For example, a user may select to view an outlined configuration of the traced image in an overlapping format with the transparent configuration of the first image. The image configuration selectors for both the first or original image and the traced image may be, for example, icons with pull down menus allowing the user to make appropriate selections, as desired.

In one configuration of the system disclosed herein, the graphics process receives a change associated with at least one of the first image and the trace image. The change may be in the form of a modification to the first image. The change may be, for example, the user using another program to edit the raster image file stored on disk. In response to receiving (e.g., detecting) the change, the graphics process disclosed herein automatically re-applies the tracing algorithm while accounting for the modification to the first image to produce a second traced image. This is done in one configuration by maintaining an association between the source (e.g. a file) of the first image and the trace image data, so that if the first image changes (e.g. a change is made to the file), the trace image can be automatically updated without the user having to re-apply the tracing algorithm. For example, a user may modify a first image by deleting a line in the image and saving the original file. In response to the deletion of the line in the first image (e.g. by detecting the update to the file, such as by detecting a change in the date and timestamp on the file), the graphics process re-applies the tracing algorithm to produce a second trace image that accounts for the deleted line. Consequently, the graphics processor displays, in an overlapping format, each of the first image and the second traced image. At least one of the first image and second image are displayable in a selectable configuration defining a rendition that image. The user selectable configuration indicates how the image is to be rendered. Examples include rendering the original or first image in its original form, or in an adjusted form (adjusted by an image processing algorithm to prepare for production of the trace version of the image, or in a transparent form. Examples of the user selectable configuration for the traced image include the traced version of the first image, an outline version, and an outline with tracing. In other configurations, the change to the first image data may be detected by having a modify or "write" bit that is associated with the image data in memory. The system disclosed herein can periodically check this bit (or set of bits) to determine if the in-memory version of the first image data (i.e., the raster data) has been modified, and if so, can automatically (i.e. without user intervention) and in real-time re-apply the trace algorithm. This feature is referred to as "Live Trace" in some configurations.

Additionally, the change associated with at least the first image and trace image may be in the form of a modification to at least one parameter of the tracing algorithm. The tracing algorithm parameters include, but are not limited to, path fitting, minimum area, corner angle and the like. For instance, upon receiving a change to the path fitting parameter of the tracing algorithm, the graphics process re-applies the tracing algorithm to the first image in real-time to produce a second traced image. As a result, the graphics process re-displays, in an overlapping format, each of the first image and the second traced image.

Other embodiments of the invention include any type of computerized device, workstation, handheld or laptop computer, or the like configured with software and/or circuitry (e.g., a processor) to process any or all of the method operations disclosed herein. In other words, a computerized device or a processor that is programmed or configured to operate in accordance with the system as explained herein is considered an embodiment of the invention.

Other embodiments of the invention that are disclosed herein include software programs to perform the steps and operations summarized above and disclosed in detail below. One such embodiment comprises a computer program product that has a computer-readable medium including computer program logic encoded thereon that, when performed in a computerized device having a coupling of a memory and a processor and a display, programs the processor to perform the operations disclosed herein. Such arrangements are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained herein.

It is to be understood that the system of the invention can be embodied strictly as a software program, as software and hardware, or as hardware alone such as within a processor, or within an operating system or a within a software application. Example embodiments of the invention may be implemented within products and/or software applications manufactured by Adobe Systems, Inc. of San Jose, Calif., USA.

BRIEF DESCRIPTION OF THE DRAWINGS

The foregoing and other objects, features and advantages of the invention will be apparent from the following more particular description of embodiments of the invention, as illustrated in the accompanying drawings and figures in which like reference characters refer to the same parts throughout the different views. The drawings are not necessarily to scale, with emphasis instead being placed upon illustrating the embodiments, principles and concepts of the invention.

DETAILED DESCRIPTION

Figure 1:
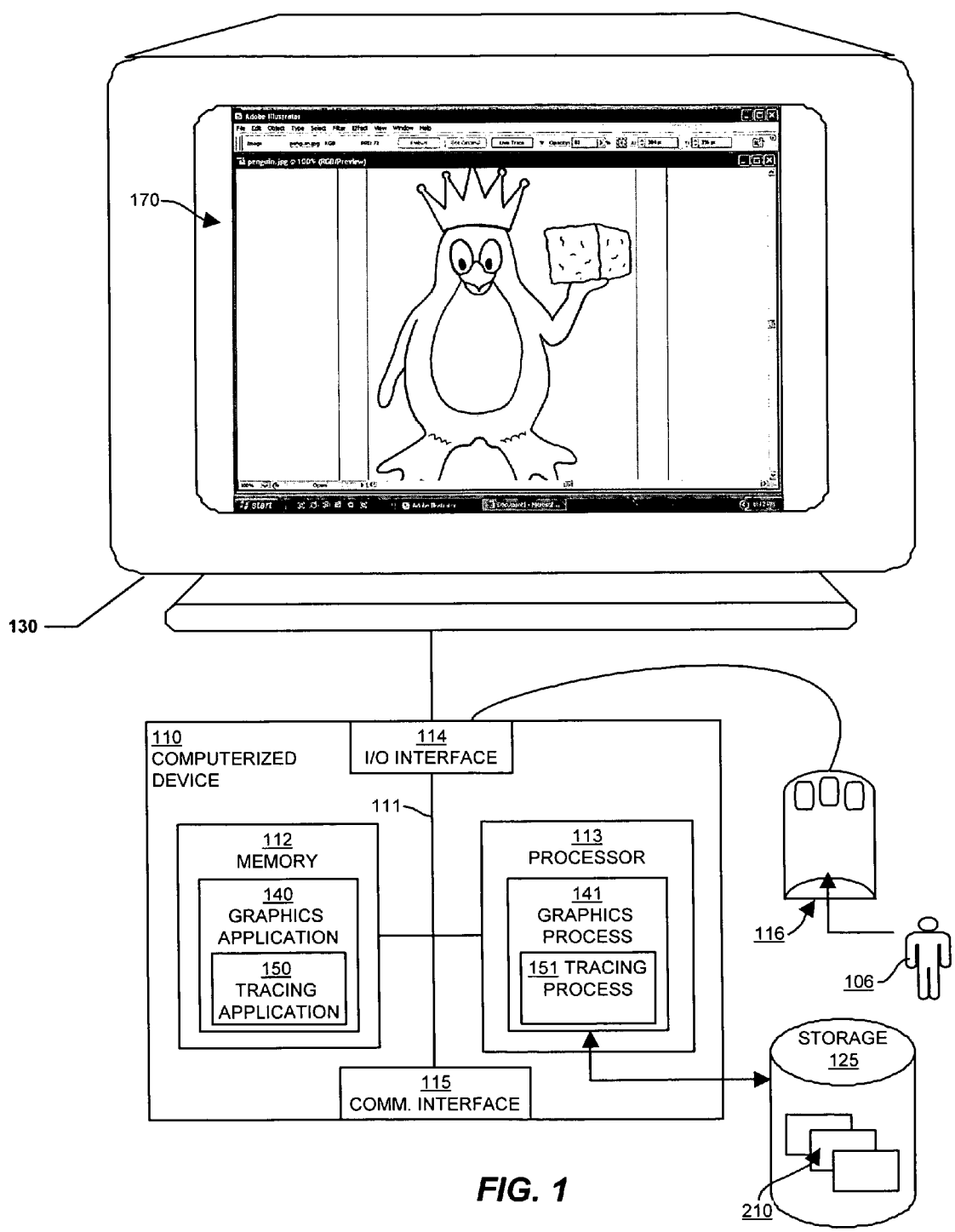
FIG. 1 is a block diagram of a computerized system configured with an application including a graphics process and tracing process in accordance with one embodiment of the invention.

FIG. 1 is a block diagram illustrating example architecture of a computer system 110 that executes, runs, interprets, operates or otherwise performs a graphics application 140 and process 141 that include a tracing application 150 and a tracing process 151 configured in accordance with embodiments of the invention. The computer system 110 may be any type of computerized device such as a personal computer, workstation, portable computing device, console, laptop, network terminal or the like. As shown in this example, the computer system 110 includes an interconnection mechanism 111 such as a data bus, motherboard or other circuitry that couples a memory system 112, a processor 113, an input/output interface 114, and a communications interface 115. An input device 116 (e.g., one or more user/developer controlled devices such as a keyboard, mouse, touch pad, etc.) couples to the computer system 110 and processor 113 through an input/output (I/O) interface 114 and enables a user 106 to provide input signals and generally control a graphical user interface 170 that the graphics application 140 and process 141 provides on the computer display 130. The communications interface 115 enables the computer system 110 to communicate with other devices (i.e., other computers) on a network such as the Internet.

The memory system 112 is any type of computer readable medium and in this example is encoded with a graphics application 140 that includes a tracing application 150 that supports generation, display, and implementation of functional operations as explained herein. The application 140 may be embodied as software code such as data and/or logic instructions (e.g., code stored in the memory or on another computer readable medium such as a removable disk) that supports processing functionality according to different embodiments described herein. During operation of the computer system 110, the processor 113 accesses the memory system 112 via the interconnect 111 in order to launch, run, execute, interpret or otherwise perform the logic instructions of the graphics application 140. Execution of graphics application 140 in this manner produces processing functionality in a graphics process 141. In other words, the process 141 represents one or more portions or runtime instances of the application 140 (or the entire application 140) performing or executing within or upon the processor 113 in the computerized device 110 at runtime.

It is noted that example configurations disclosed herein include the graphics application 140 itself including the tracing process 151 (i.e., in the form of un-executed or non-performing logic instructions and/or data). The graphics application 140 may be stored on a computer readable medium (such as a floppy disk), hard disk, electronic, magnetic, optical or other computer readable medium. The graphics application 140 may also be stored in a memory system 112 such as in firmware, read only memory (ROM), or, as in this example, as executable code in, for example, Random Access Memory (RAM). In addition to these embodiments, it should also be noted that other embodiments herein include the execution of the graphics application 140 in the processor 113 as the graphics process 141 including the tracing process 151. In another alternative configuration, the tracking process may be embedded in the operating system or may operate as a separate process from the application and may track all user input or only some user input (such as mouse movement or clicks, but not keyboard input). Those skilled in the art will understand that the computer system 110 may include other processes and/or software and hardware components, such as an operating system not shown in this example.

Generally, the system disclosed herein provides the ability for a user to concurrently view multiple configurations of digital images and their counterpart traced images in an overlapping concurrent manner to allow the user to visually compare the two versions of the image (the original and the traced version). As will be discussed more fully herein, the system also provides mechanisms and techniques for interactively modifying images and tracing algorithm parameters on the fly without having to execute separate computer applications. For example, there may be times when a user would want to base a new drawing on an existing piece of artwork. More specifically, a user may want to create a digital graphic based on a pencil sketch drawn on a sheet of paper that is then scanned in, or a raster image saved in another graphics program. In either case, the user could import the graphic into a graphical editor application (e.g., Adobe Illustrator®) by scanning the pencil-sketched graphic or opening the raster image in the graphical editor. In one embodiment of the system described herein, the graphical editor converts raster images into detailed vector graphics that are easy to edit, resize and manipulate without distortion. As a result, the amount of time it takes to recreate a scanned drawing on-screen is reduced from days to minutes, or even seconds, without loss of quality. Furthermore, in another embodiment a user may interactively adjust the results of a traced image using a rich assortment of vectorization options including, but not limited to, preprocessing, tracing and overlay options. The interactive quality allows a user to adjust and manipulate digital images in real-time within a single executable computer application.

Further details of configurations explained herein will now be provided with respect to flow charts of processing steps that show the high level operations disclosed herein to perform the tracing process 151, as well as graphical representations that illustrate implementations of the various configurations of the tracing process 151.

Figure 2:
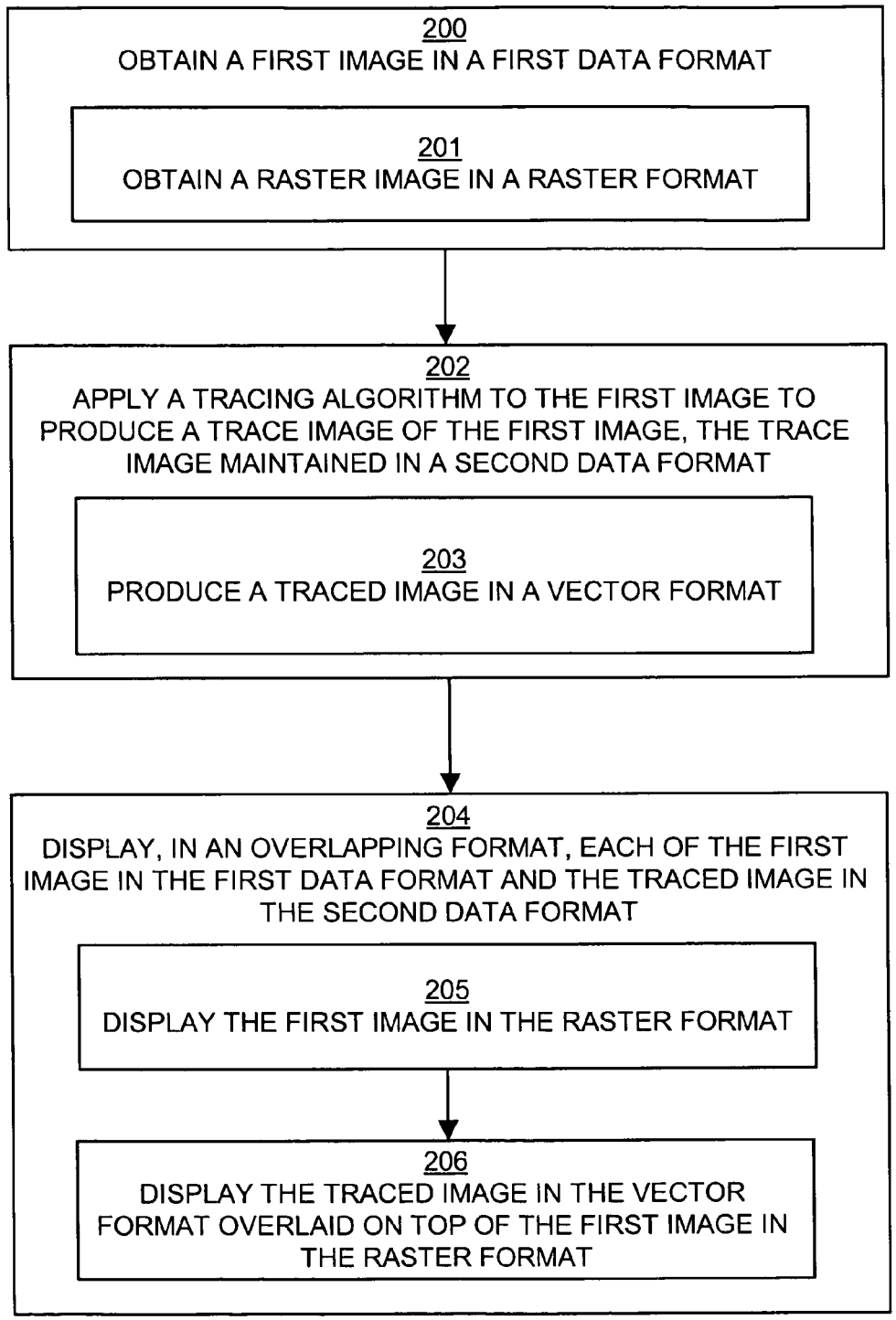
FIG. 2 is a flow chart of processing steps that shows high-level processing operations performed by the graphics process and tracing process when it obtains a first image in a first data format, applies a tracing algorithm to the first image to produce a traced image, and displays the first image and traced image in an overlapping format, in accordance with one example configuration of the invention.

FIG. 2 is a flow chart of processing steps that shows high-level processing operations performed by the graphics process 141 when it obtains a first image, applies a tracing algorithm to the first image to produce a traced image, and then displays the first image and traced image in an overlapping format in accordance with one example configuration of the invention.

In step 200, graphics process 141 obtains a first image in a first data format. Typically, the graphics application is a graphical editor (e.g., Adobe Illustrator) whereby the graphical editor obtains the first image using conventional file retrieval means (e.g., opening a file). In one embodiment, the tracing process opens a digital image file so that the digital image is visible in the GUI 170 on the display 130.

As depicted in FIG. 1 of an example configuration, a digital image 175 is located in a workspace 171 of the GUI 170. The workspace is encapsulated in a graphical editor process 140 (in this case Adobe Illustrator) which indicates the image name 181 in various locations throughout the GUI 170. In this particular configuration, a user may obtain a first image with image name 181 by selecting a file menu 182 which provides the user conventional means for choosing and retrieving a digital image file. Typically, a user may select various menus and buttons contained in the GUI 170 by using the input device 116 to 'click' on the various indicators. Furthermore, the tracing process 151, which is encapsulated in graphical editor 140, may be activated by clicking on the trace activation button 180.

Figure 3:
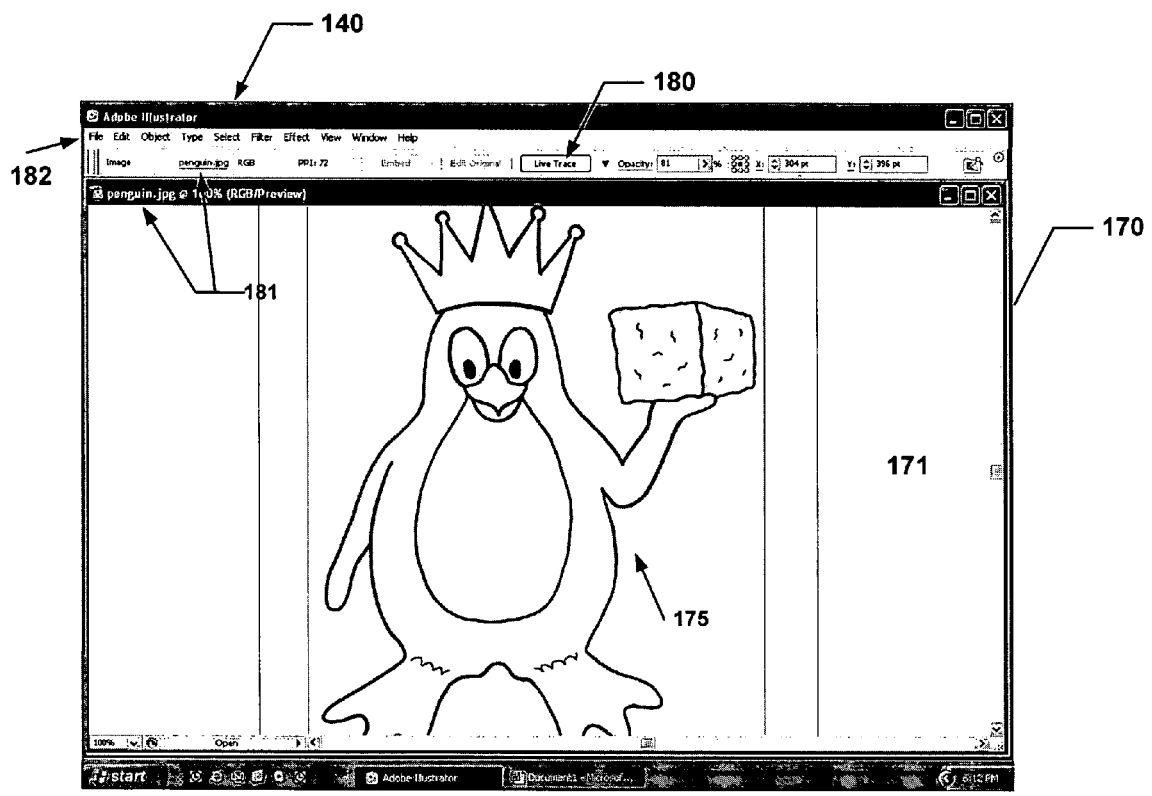
FIG. 3 is a graphical representation that illustrates one implementation of the graphics process and tracing process as a GUI displaying a first image.

In step 201, graphics process 141 obtains a raster image in a raster data format. For example, the raster image obtained by tracing process 151 may be a scanned image of a pencil sketch or an image captured by a digital camera stored in a raster data format. FIG. 3 shows a raster image 175 which has been obtained by graphical editor 140 and is displayed in the workspace 171 of GUI 170.

Figure 4:
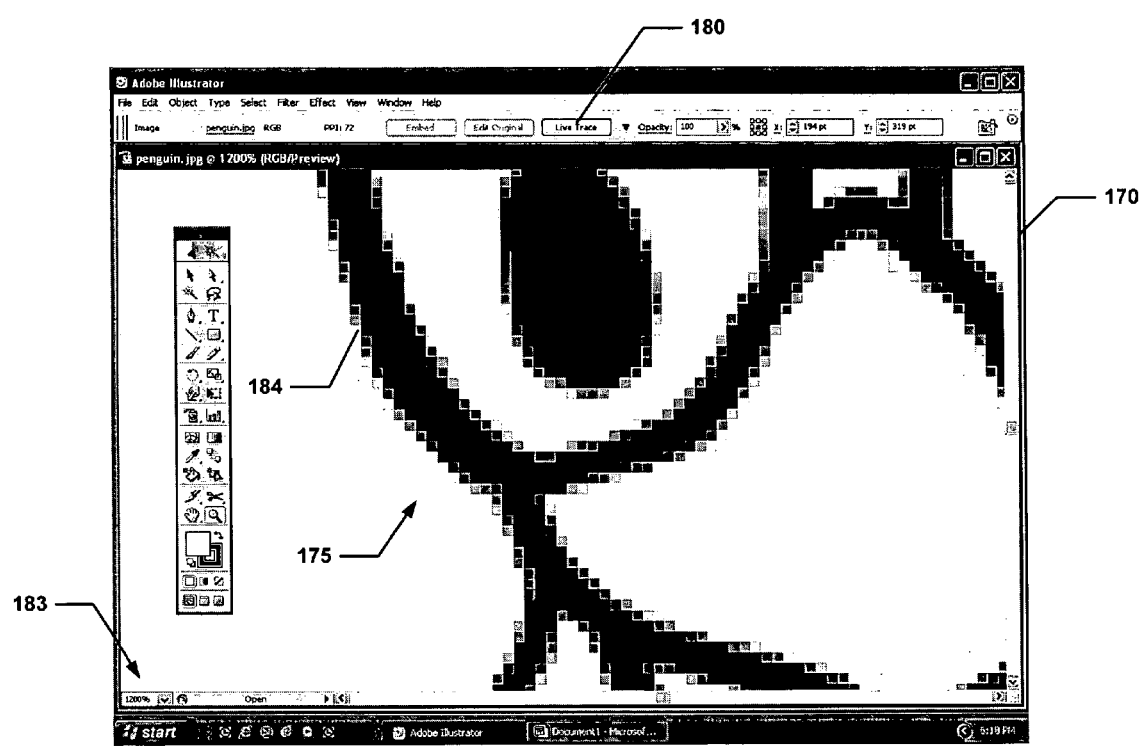
FIG. 4 is a graphical representation that illustrates one implementation of the graphics process and tracing process as a GUI displaying a close-up view of the first image.

For purposes of illustrating the coarse quality of lines and edges in raster images, FIG. 4 depicts the GUI 170 containing a close-up or zoomed-in view of raster image 175, with edge 184 shown before the tracing process 151 has been activated. As exemplified in FIG. 4 by focusing on edge 184, the edges of lines contained in raster images generally have a granular-like or pixel-based quality when viewed at an increased scale. Zoom indicator 183 displays the degree to which the relative size of the image has been increased or decreased within GUI 170 (in this example 1200%).

In step 202, tracing process 151 is applied to the first image to produce a trace image that is maintained in a second data format. In other words, after the first image has been obtained by graphics process 141, the tracing process 151 is activated to create a new traced image in a second data format such as a vector image format. For example, FIG. 4 depicts a particular embodiment where the tracing process 151 would be activated by clicking the trace activation button 180. As a result, the traced image comprises, inter alia, substantially the same appearance as the first image, but with smoother lines and edges traced and maintained (either in storage or in volatile memory) in a vector image data format. It should be noted that the smoothness of the lines and edges of vector images are generally resolution independent such that the smooth appearance is manifested when viewed at any scale or zoom intensity. Furthermore, after the tracing process 151 has completed producing the traced image, the traced image is concurrently maintained in the graphics process 141 along with the first image. In particular, the system maintains both an identity of the original image (e.g. a path and file name, and a reference to the image in memory) and an identity of the traced version of the original image, within a trace object. This allows the system to keep the relationship between the original and the traced version up to date in real-time.

Figure 5:
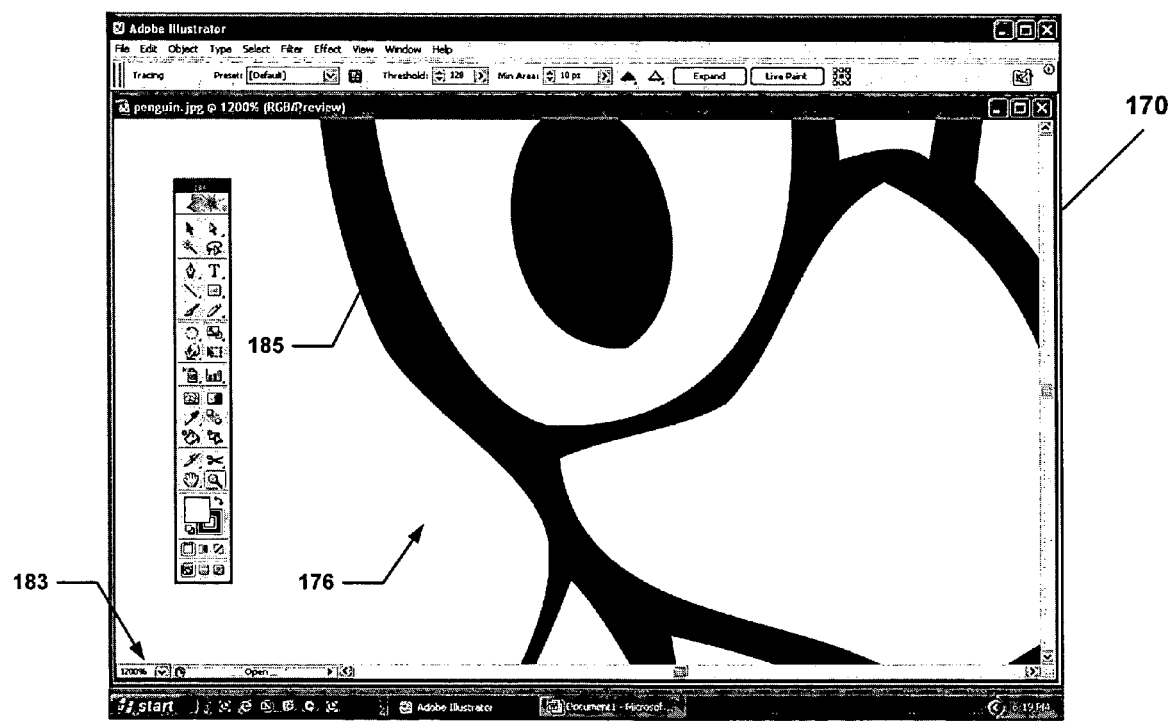
FIG. 5 is a graphical representation that illustrates one implementation of the graphics process and tracing process as a GUI displaying a close-up view of a traced image.

For example, FIG. 5 illustrates an example configuration whereby the GUI 170 contains a close-up view (1200% as evidenced by zoom indicator 183) of a traced image 176 produced from the first image 175. In this example, traced image 176 was produced by clicking trace activation button 180 (as shown in FIG. 4) to activate tracing process 151 which operated on the first image 175. As a result, the edges 185 of the vector image 176 are no longer granular as in the raster image 175 and instead manifest a smooth appearance. Also in this particular configuration, the first image 175 is still maintained by graphics process 141 along with traced image 176. Thus, the first image 175 has not been overwritten, destroyed or erased as a result of executing tracing process 151.

In step 203, tracing process 151 produces a traced image in a vector format. Thus, in one embodiment, tracing process 151 is applied to a first image in raster format to produce a traced image in a vector format. For example, FIG. 5 depicts GUI 170 containing a close-up view of traced image 176 in a vector format whereby edges 185 manifest a smooth, nongranular appearance.

In step 204, graphics process 141 displays, in an overlapping format, each of the first image in the first data format and the traced image in the second data format. In other words, since the first image and the traced image are concurrently maintained in the graphics process 141, the two images may be viewed concurrently in an overlapping format. This step is similar to placing a traced image on semi-transparent tracing paper directly over the original image such that the two images may be viewed concurrently. As will be discussed further, the first image and the traced image may be displayed in a plurality of configurations that provide a user various means for analyzing the results of the tracing process 151.

In steps 205 and 206, while displaying the first image and the traced image in an overlapping format, graphics process 141 displays the first image in a raster format and the traced image in a vector format, respectively. As an example, in one embodiment, tracing process 151 is applied to a first image in a raster format to produce a traced image in a vector format. Thus, in this particular embodiment, the original raster image and the traced vector image may be viewed concurrently while situated in an overlapping format.

Figure 6:
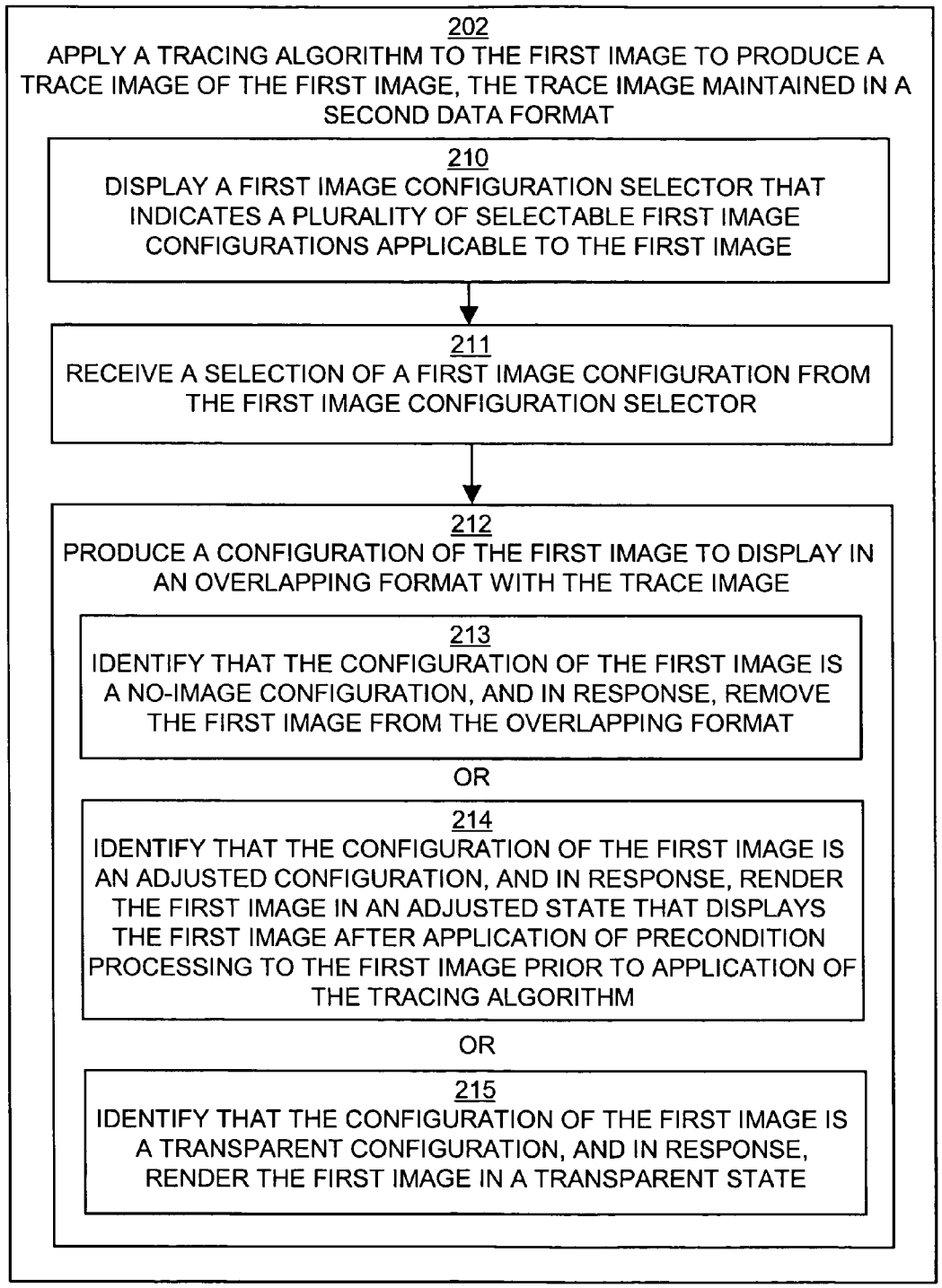
FIG. 6 is a flow chart of processing steps that shows high-level processing operations performed by the graphics process when it applies a tracing algorithm to the first image to produce a traced image of the first image, in accordance with one example configuration of the invention.

FIG. 6 is a flow chart of processing steps that shows certain details of the graphics process 141 when it applies a tracing algorithm to the first image to produce a traced image of the first image, which is maintained in a second data format, in accordance with one example configuration of the invention.

In sub-step 210, graphics process 141 displays a first image configuration selector 186 that indicates a plurality of selectable first image configurations applicable to the first image. After the tracing process 151 has been applied to the first image, a user is given the option to view the first image in various configurations. In one embodiment, a user is provided with a first image configuration selector (e.g., a drop down menu in the GUI) that enumerates a plurality of configurations of the first image.

Figure 7:
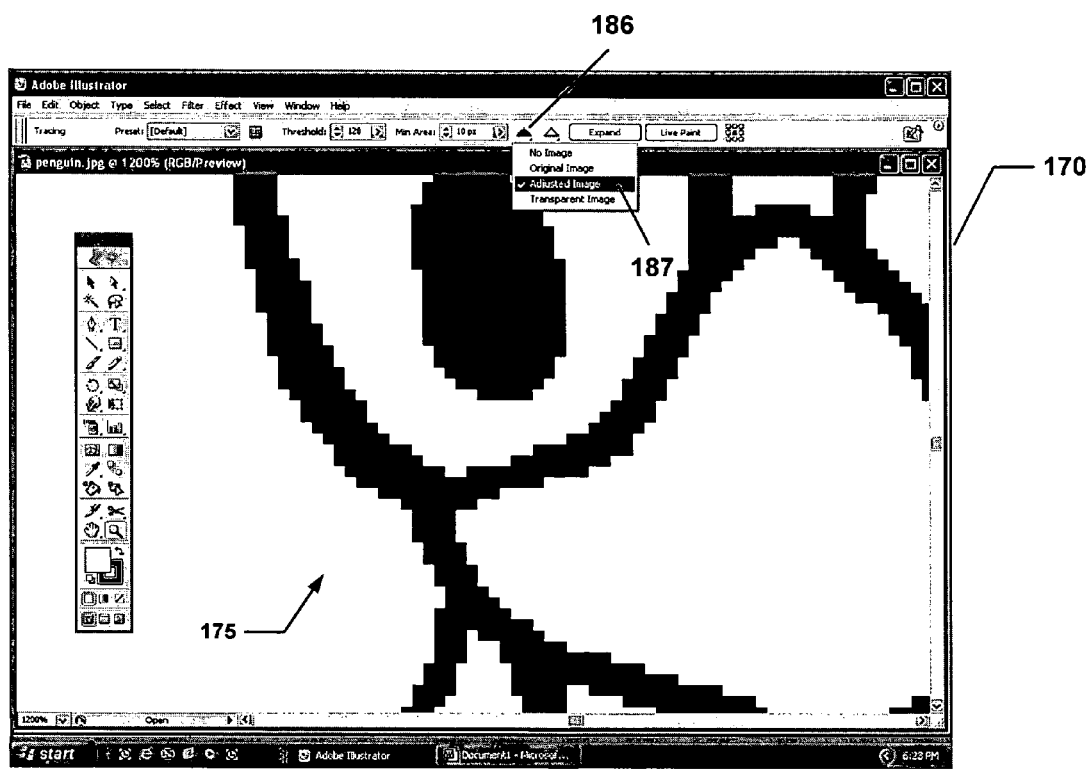
FIG. 7 is a graphical representation that illustrates one implementation of the graphics process and tracing process as a GUI displaying an adjusted configuration of the first image.

For example, FIG. 7 illustrates a configuration of the first image 175 contained in GUI 170 after tracing process 151 has been applied to the first image. In this particular embodiment, a first image configuration selector 186 is shown as a dark triangle having a drop down menu underneath that enumerates a plurality of configurations of the first image. As evidenced by the highlighted selection 187, the user in this example has selected the "Adjusted Image" configuration to view in the GUI 170. When referring to the embodiment illustrated in FIG. 7, it should be noted that the list of configurations displayed in the drop down menu of the first image configuration selector 186 is not exclusive and may contain any combination of configurations, either shown or not shown in this example, as dictated by the particular software application.

In sub-step 211, subsequent to displaying a first image configuration selector to a user, graphics process 141 receives a selection of a first image configuration from the first image configuration selector 186. Upon viewing the list of first image configurations in the first image configuration selector 186, a user selects the particular first image configuration to be viewed. Consequently, graphics process 141 receives this selection and produces the particular first image configuration in the GUI 170. For example, FIG. 7 depicts one embodiment where a user has selected the "Adjusted Image" configuration 187 in the first image configuration selector 186. Typically, as shown in FIG. 7, the receipt of the selection of a first image configuration is by way of highlighting an item in a GUI drop down menu.

In sub-step 212, graphics process 141 produces a configuration of the first image to display in an overlapping format with the trace image. In accordance with sub-step 211, graphics process 141 produces the first image configuration commensurate with the receipt of the user's selection. For example, if in one embodiment the graphics process 141 received a first image configuration selection for the "Adjusted Image" configuration 187 as shown in FIG. 7, graphics process 141 would subsequently produce the adjusted image configuration of the first image in the GUI 170.

In one embodiment, the graphics process 141 performs the image processing contemporaneously with the receipt of the first image configuration selection such that the first image is created in memory after being selected by the user. In other words, the graphics application displays and creates the first image configuration after the user has made his selection. Alternatively, in another embodiment, the graphics process 141 performs the image processing for the various first image configurations during, or shortly after, execution of the tracing process 151. Thus, in this example, the various first image configurations available to a user are created in memory before the user has made his selection. As a result, in sub-step 212 the graphics process 141 displays, but does not create in memory, the first image configuration upon receipt of the user's selection.

In sub-step 213, graphics process 141 identifies that the configuration of the first image is a no-image configuration and, in response, removes the first image from the overlapping format. The no-image configuration is an example of one of the many first image configurations available to a user. In essence, the no-image configuration is manifest when graphics process 141 removes the first image, or any first image configuration thereof, from the computer display 130. The purpose of producing a no-image first image configuration is to allow the user to view the traced image, or any traced image configuration thereof, by itself. Thus, in one embodiment, the user would be able to view and analyze the traced image and its configurations without the overlapping first image or counterpart configurations.

In one embodiment, suppose that in FIG. 7 the image shown in GUI 170 is that of a traced image. Further assume for this example that the first image configuration selector 186 has the highlighted selection 187 over the "No Image" item in the drop down menu. Thus, in this particular embodiment illustrating the no-image configuration of the first image, the traced image is shown by itself in GUI 170 such that a user could view and analyze the traced image without the overlapping first image or any first image configurations.

It should be noted that the list of enumerated first image configurations (e.g., no-image configuration) disclosed herein is not an exhaustive list. As such, other configurations not mentioned herein may be developed and used when applicable to augment the functionality of the graphics application 140 and tracing application 150.

In sub-step 214, graphics process 141 identifies that the configuration of the first image is an adjusted configuration and, in response, renders the first image in an adjusted state that displays the first image after application of precondition processing to the first image prior to application of the tracing algorithm. Before the tracing process 151 is applied to a first image, some precondition processing must occur to put the first image in a state that is amenable for application of the tracing algorithm. More specifically, the precondition processing assigns each pixel in the first image with either a black or a white value depending on a variable threshold value. The threshold value is inversely proportional to the grayscale value of each pixel such that the lower the threshold value, the darker each pixel's grayscale value must be in order to be assigned a black preconditioned pixel value, and vice versa. In other words, lower threshold value images typically have a thinner, less robust line and shape thickness. With respect to the first image adjusted configuration, this intermediate image configuration allows a user to view the edges of lines and shapes as defined by the threshold value before the tracing process 151 is applied.

For example, FIG. 7 shows one embodiment where an adjusted configuration 175 of a first image is displayed in GUI 170. Additionally, first image configuration selector 186 shows the highlighted "Adjusted Image" selection 187 in the drop down menu. Moreover, threshold indicator 188 is shown with a threshold value of 128. In this particular embodiment, a threshold value of 128 is a medium value in a threshold scale ranging from 0 to 256. As such, adjusted configuration 175 shows the first image after precondition processing has been applied with a threshold value of 128.

In sub-step 215, graphics process 141 identifies that the configuration of the first image is a transparent configuration and, in response, renders the first image in a transparent state. In a transparent state, the pixels in the first image are assigned grayscale values typically in a median range between white (e.g., grayscale value of 0) and black (e.g., grayscale value of 1). Thus, while in a transparent state, the first image can be viewed in conjunction with an overlapping image (e.g., the traced image) such that the first image is visible in regions where the first and traced images overlap, as well as in regions where the first image and traced images do not overlap. For example, when a transparent region of a first image overlaps with a transparent region of a second image, the relative grayscale values of the overlapping regions are typically combined (or assigned a predetermined grayscale value larger than that of the first and second images) to exhibit a darker appearance and, thus, indicating an overlap in the images. In one embodiment, the transparency of the first image may be adjusted to render the first image as either more transparent or more opaque (e.g., adjusting the relative grayscale value of the pixels of the first image). Also, in other embodiments the transparent configuration may be viewed by itself without the overlapping traced image.

Figure 8:
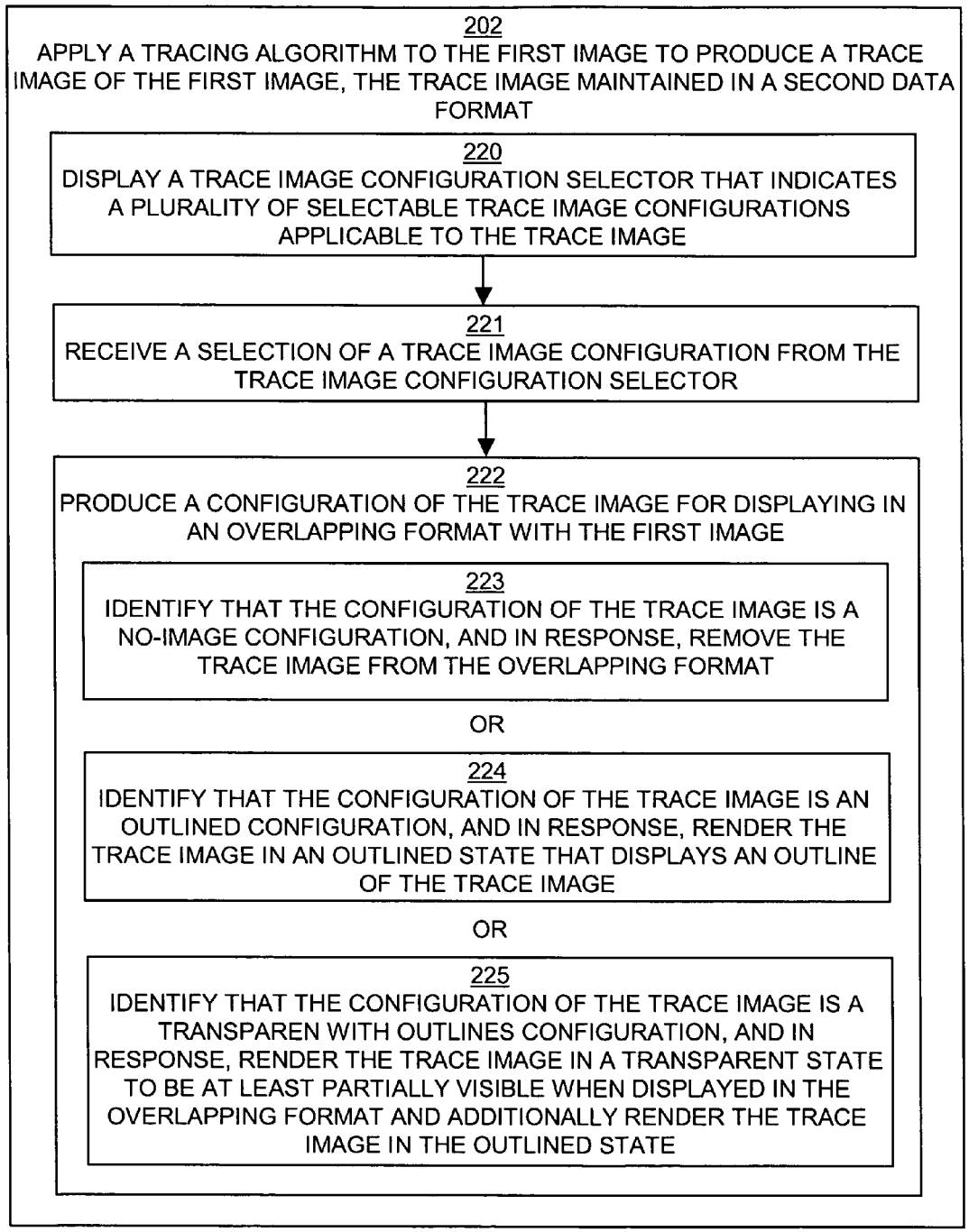
FIG. 8 is a flow chart of processing steps that shows high-level processing operations performed by the graphics process when it applies a tracing algorithm to an adjusted first image to produce a traced image of the first image, in accordance with one example configuration of the invention.

FIG. 8 is a flow chart of processing steps that shows certain details of the tracing process 151 when it is applied to the first image to produce a trace image of the first image, and whereby the traced image is maintained in a second data format in accordance with one example configuration of the invention.

In sub-step 220, graphics process 141 displays a trace image configuration selector that indicates a plurality of selectable traced image configurations applicable to the traced image. After the tracing process 151 has been applied to the first image, a user is given the option to view the traced image in various configurations. In one embodiment, a user is provided with a traced image configuration selector (e.g., a drop down menu in the GUI 170) that enumerates a plurality of configurations of the traced image.

Figure 9:
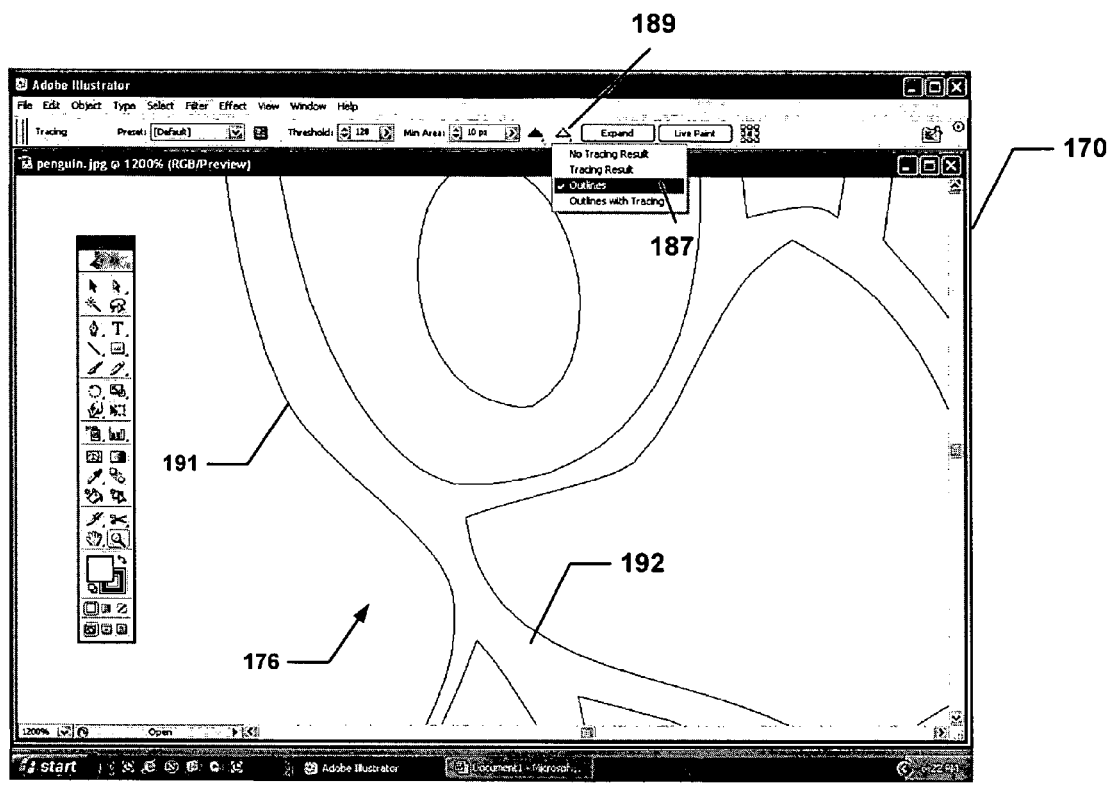
FIG. 9 is a graphical representation that illustrates one implementation of the graphics process and tracing process as a GUI displaying an outlined configuration of the traced image.

For example, FIG. 9 illustrates a configuration of a traced image 176 contained in GUI 170 after tracing process 151 has been applied to a first image. In this particular embodiment, a traced image configuration selector 189 is shown as a shaded triangle having a drop down menu underneath that enumerates a plurality of configurations of the traced image. As evidenced by the highlighted selection 187, the user in this example has selected the "Outlines" configuration to view in the GUI 170. When referring to the embodiment illustrated in FIG. 7, it should be noted that the list of configurations displayed in the drop down menu of the first image configuration selector 189 is not exclusive and may contain any combination of configurations, either shown or not shown in this example, as dictated by the particular software application.

In sub-step 221, subsequent to displaying a traced image configuration selector to a user, graphics process 141 receives a selection of a traced image configuration from the traced image configuration selector 189. Upon viewing the list of traced image configurations in the traced image configuration selector 186, a user selects the particular traced image configuration to be viewed. Consequently, the graphics process 141 receives this selection and produces the particular traced image configuration in the GUI 170. For example, FIG. 9 depicts one embodiment where a user has selected the "Outlines" configuration 187 in the first image configuration selector 186. Typically, as shown in FIG. 9, the receipt of the selection of a traced image configuration is typically by way of highlighting an item in a GUI drop down menu.

In sub-step 222, graphics process 141 produces a configuration of the traced image to display in an overlapping format with the first image. In accordance with sub-step 221, graphics process 141 produces the traced image configuration commensurate with the receipt of the user's selection. For example, if in one embodiment the graphics process 141 received a traced image configuration selection for the "Outlines" configuration 187 as shown in FIG. 9, graphics process 141 would subsequently produce the outlined configuration of the first image in the GUI 170.

In one embodiment, the graphics process 141 performs the image processing contemporaneously with the receipt of the traced image configuration selection such that the traced image is created in memory after being selected by the user. In other words, the graphics application displays and creates the traced image configuration after the user has made his selection. Alternatively, in another embodiment, the graphics process 141 performs the image processing for the various traced image configurations during, or shortly after, execution of the tracing process 151. Thus, in this particular example, the various first image configurations available to a user are created in memory before the user has made his selection. As a result, in sub-step 222 the graphics process 141 displays, but does not create in memory, the first image configuration upon receipt of the user's selection.

In sub-step 223, graphics process 141 identifies that the configuration of the traced image is a no-image configuration and, in response, removes the traced image from the overlapping format. The no-image configuration is an example of one of the many traced image configurations available to a user. In essence, the no-image configuration of the traced image operates similarly to that of the no image configuration of the first image, and is manifest when graphics process 141 removes the traced image, or any traced image configuration thereof, from the computer display 130. The purpose of producing a no-image traced image configuration is to allow the user to view the first image, or any first image configuration thereof, by itself. Thus, in one embodiment, the user would be able to view and analyze the first image and its configurations without the overlapping traced image or counterpart configurations.

For example, FIG. 7 illustrates a first image configuration 175 (adjusted image) displayed in the GUI 170 in conjunction with a no-image configuration of a traced image 190. In this example, only the adjusted image is displayed since the traced image configuration has been selected as the no-image configuration. Thus, the adjusted image (or any other first image configuration for that matter) may be viewed by itself without the overlapping traced image or traced image configurations.

It should be noted that the list of enumerated traced image configurations (e.g., no-image configuration) disclosed herein is not an exhaustive list. As such, other configurations not mentioned herein may be developed and used when applicable to augment the functionality of the graphics application 140 and tracing application 150.

In sub-step 224, graphics process 141 identifies that the configuration of the traced image is an outlined configuration and, in response, renders the traced image in an outlined state that displays an outline of the traced image. In essence, the outlined configuration displays only the edges of the resultant lines and shapes of the traced image. Thus, the interior regions of lines and shapes in the outlined configuration are not displayed (are empty) and only the edges of the traced image are visible. The purpose of the outlined configuration is to allow a user to view only the edges of the resultant traced image in conjunction with any configuration of the first image.

For example, FIG. 9 shows one embodiment with an outlined configuration 190 of a traced image in the GUI 170. Traced image configuration selector 189 has the "Outlines" selection highlighted 187 to show that the outlined configuration is the current view in the GUI 170. Also in this example, only the edges 191 of the traced image (or outlines) are visible such that the interior regions of the traced images cannot be seen. In sub-step 225, graphics process 141 identifies that the configuration of the traced image is a transparent with outlines configuration and, in response, renders the traced image in a transparent state to be at least partially visible when displayed in the overlapping format and, additionally, renders the traced image in the outlined state. In a transparent state, the traced image operates similarly to the first image in that the pixels in the traced image are assigned grayscale values typically in a median range between white (e.g., grayscale value of 0) and black (e.g., grayscale value of 1). By grayscale value, what is meant herein is a value that indicates luminosity, or lightness. Accordingly, this description extends to color workflows as well as traditional grayscale black and white.

Thus, while in a transparent state, the traced image can be viewed in conjunction with an overlapping image (e.g., the first image) such that the traced image is visible in regions where the traced and first images overlap, as well as in regions where the traced image and first images do not overlap. For example, when a transparent region of a traced image overlaps with a transparent region of a second image, the relative grayscale values of the overlapping regions are typically combined (or assigned a predetermined grayscale value larger than that of the traced and second images) to exhibit a darker appearance and, thus, indicating an overlap in the images. In one embodiment, the transparency of the traced image may be adjusted to render the traced image as either more transparent or more opaque (e.g., adjusting the relative grayscale value of the pixels of the traced image). In addition to the transparent characteristics, the transparent with outlines configuration also displays the outlines of the traced image as in the outlined configuration. Thus, unlike the empty interior regions in the pure outlined configuration of the traced image described herein, the interior regions of the transparent with outlines configuration are displayed in a transparent state.

For example, suppose that FIG. 9 shows an embodiment having a traced image in the transparent with outlines configuration 190 in the GUI 170. Further assume for this example that the outlines 191 of the traced image encapsulate a transparent interior region 192. Thus, the outlines 191 and transparent interior region 192 of the traced image combine to create the transparent with outlines configuration 190.

Figure 10:
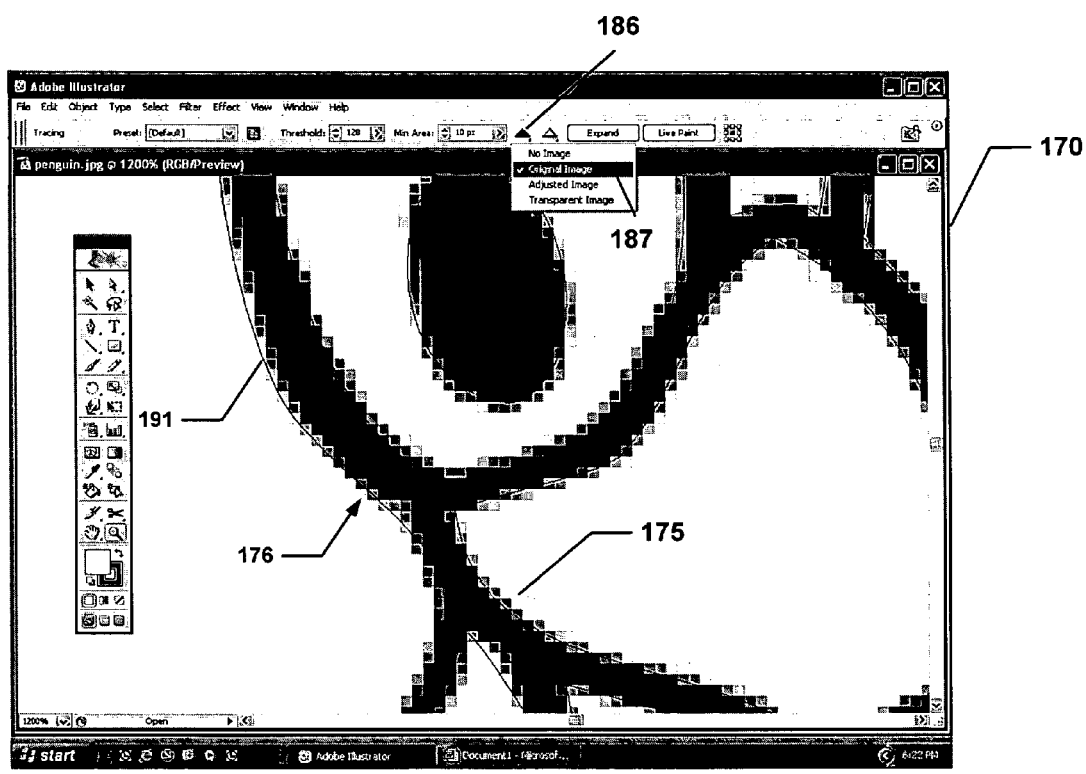
FIG. 10 is a graphical representation that illustrates one implementation of the graphics process and tracing process as a GUI displaying a first image in an overlapping format with an outlined configuration of the traced image.

In another embodiment, as illustrated in FIG. 10, a first image 175 is shown as a raster image and is displayed in an overlapping format with an outlined configuration of a traced image 176 in GUI 170. In this example, raster image 175 is visible inside of the outlines 191 of the outlined configuration of the traced image. Furthermore, the first image configuration selector 186 is displayed showing that the original first image (raster image) has been selected in the highlighted area 187 of the drop down menu. As illustrated in this example embodiment, a user may analyze the outlines of the traced image to determine the sufficiency of the traced image result.

Figure 11:
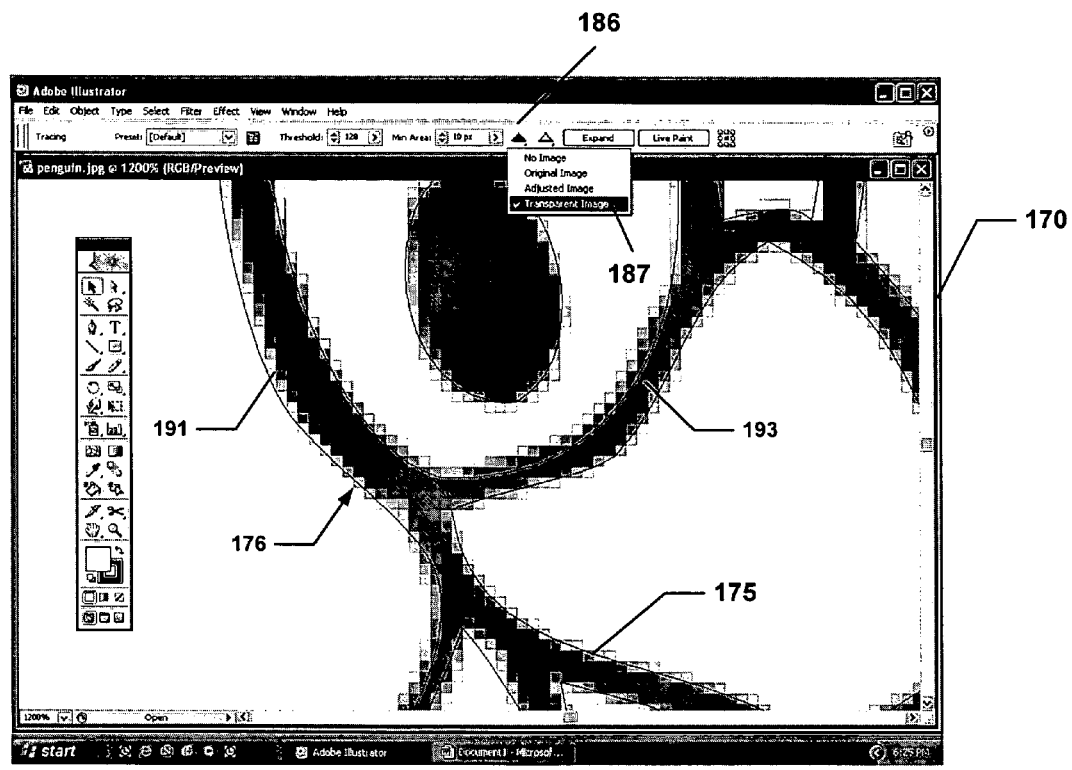
FIG. 11 is a graphical representation that illustrates one implementation of the graphics process and tracing process as a GUI displaying a transparent configuration of the first image in an overlapping format with an outlined configuration of the traced image.

In yet another embodiment, as shown in FIG. 11, a transparent configuration of a first raster image 175 is displayed in an overlapping format with an outlined configuration of a traced image 176 in GUI 170. In this example, the transparent region 193 of the raster image 175 is visible inside the outlines 191 of the outlined configuration of the traced image. Moreover, the first image configuration selector 186 is displayed showing that the transparent configuration of the first image (raster image) has been selected in the highlighted area 187 of the drop down menu. As shown in this example, the transparent region 193 of the raster image 175 has gray shading that indicates that the raster image is in a transparent state.

Figure 12:
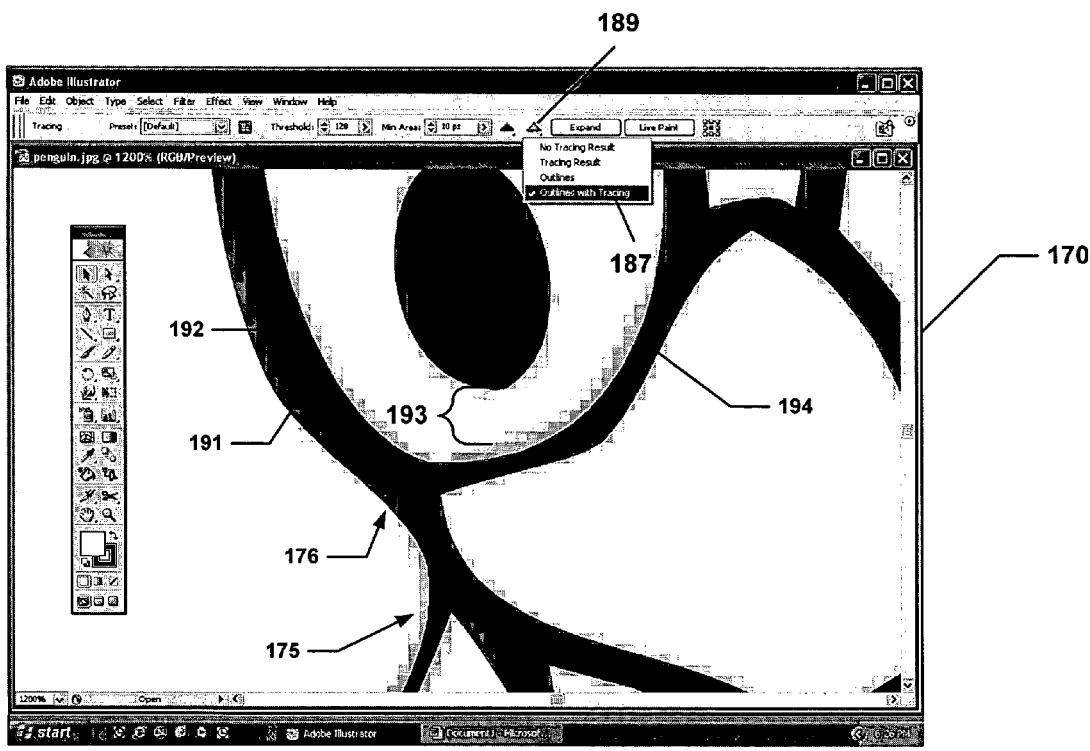
FIG. 12 is a graphical representation that illustrates one implementation of the graphics process and tracing process as a GUI displaying a transparent configuration of the first image in an overlapping format with a transparent with outlines configuration of the traced image.

In another embodiment, as shown in FIG. 12, a transparent configuration of a first raster image 175 is displayed in an overlapping format with a transparent with outlines configuration of a traced image 176 in GUI 170. In this example, the transparent region 193 of the raster image 175 is overlaid with the transparent region 192 of the traced image to yield a darker region 194 exemplifying the region where the two images overlap. Furthermore, the outlines 191 of the traced image encompass the transparent interior region of the traced image and part of the transparent region of the first (raster) image. Also, the traced image configuration selector 189 is displayed showing that the transparent with outlines configuration of the traced image 176 has been selected in the highlighted area 187 of the drop down menu.

Figure 13:
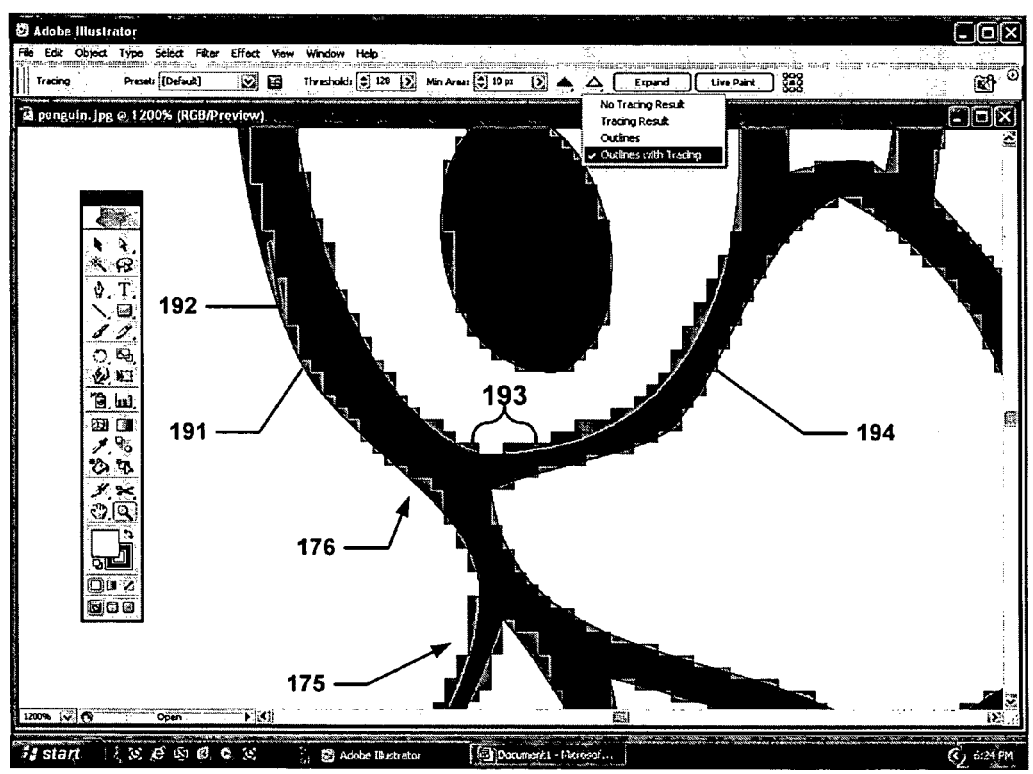
FIG. 13 is a graphical representation that illustrates one implementation of the graphics process and tracing process as a GUI displaying an adjusted configuration of the first image in an overlapping format with a transparent with outlines configuration of the traced image.

In one example embodiment, as illustrated in FIG. 13, an adjusted configuration of a first raster image 175 is displayed in an overlapping format with a transparent with outlines configuration of a traced image 176 in GUI 170. In this example, the black regions 194 represent the area where the adjusted configuration of the first image and the transparent configuration of the traced image overlap. The gray areas 192 inside the outlines 191 of the traced image 176 represent the transparent region of the traced image 176 that does not overlap with the adjusted configuration of the first image 175. Moreover, the gray areas 193 outside the traced image outlines 191 represent the adjusted configuration of the first image 175 that does not overlap with the transparent region of the traced image 176. Also, the traced image configuration selector 189 is displayed showing that the transparent with outlines configuration of the traced image 176 has been selected in the highlighted area 187 of the drop down menu.

It should be noted that in embodiments disclosed herein, any first image configuration may be viewed in an overlapping format with any traced image configuration. Depending on the various types of image data used and user preferences, each overlapping combination of first image and traced image configurations embodies its own unique purpose and application to assist the user in the creative arts, specifically graphic design and image processing. As noted, the list of first and traced image configurations disclosed herein in not exclusive and may include other configurations commensurate with the spirit and scope of the invention.

Figure 14:
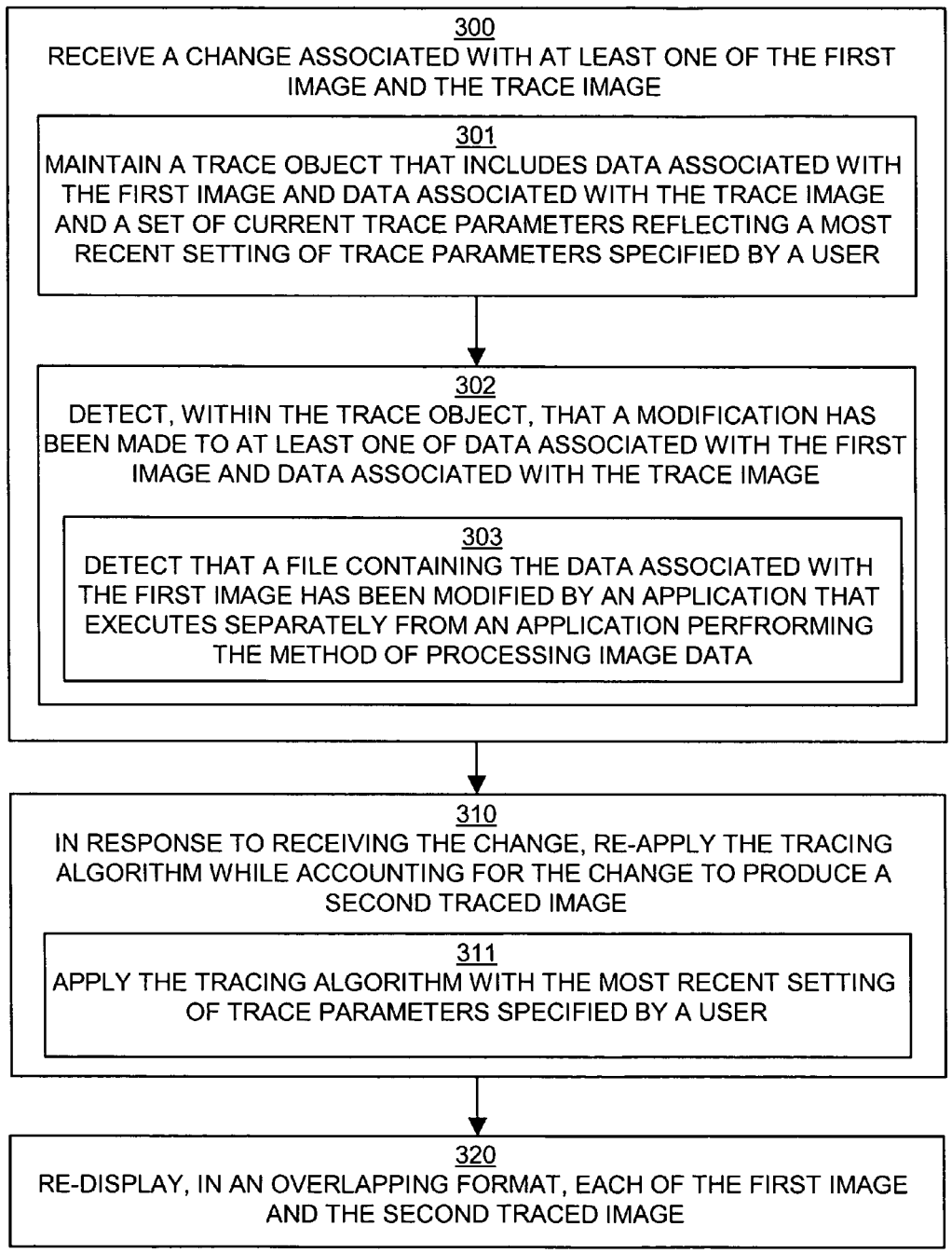
FIG. 14 is a flow chart of processing steps that shows high-level processing operations performed by the graphics process to provide "liveness" to the trace feature, when it receives a change associated with at least one of the first image and the traced image, in accordance with one example configuration of the invention.

FIG. 14 is a flow chart of processing steps that shows certain details of the graphics process 141 when it receives a change associated with at least one of the first image and the traced image in accordance with one example configuration of the invention.

Figure 15:
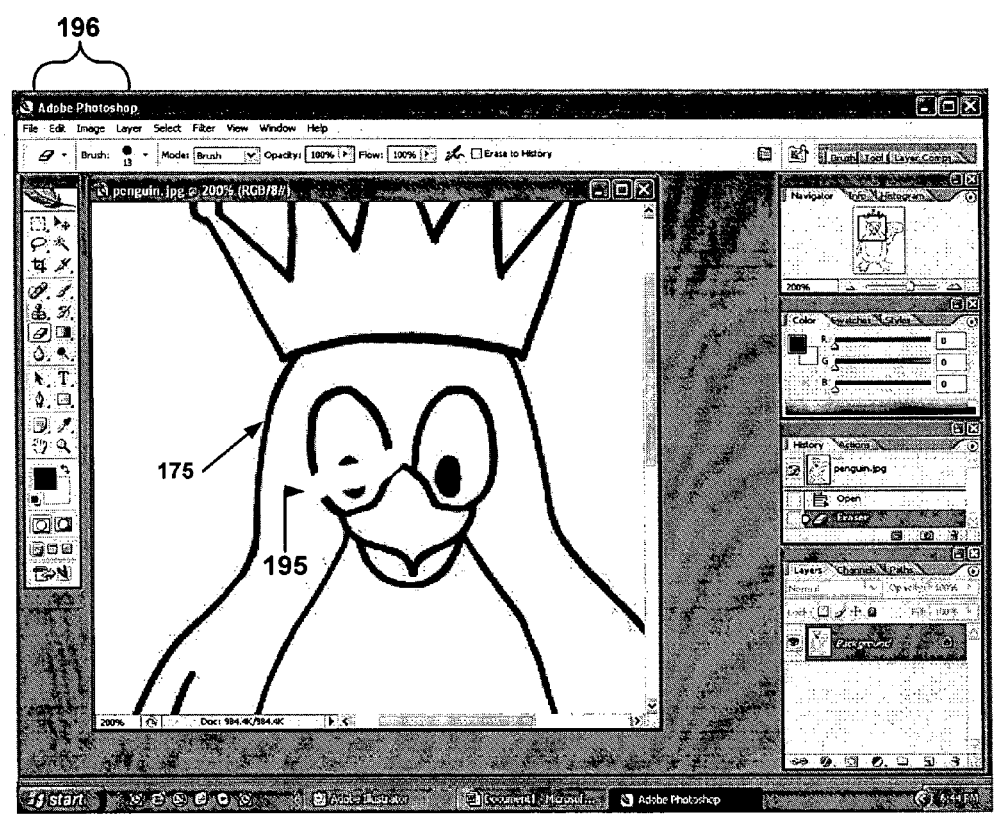
FIG. 15 is a graphical representation that illustrates a modification to the first image as performed second graphics editor application separate from the graphics application performing the method of processing image data.

In sub-step 300, upon a user modifying data associated with either the first image or traced image, the graphics process 141 receives a change associated with at least one of the first image and the traced image. In other words, after the tracing process 151 has been applied to the first image, a user may modify the first and/or traced image via the graphics process 141 or another graphics editor application (e.g., Adobe Photoshop). For example, FIG. 15 shows a sample configuration where a first image 175 has been modified in a second graphics editor 196 (Adobe Photoshop) than graphics application 140. In this example, a user has made a modification 195 in the second graphics editor 196 by erasing part of the first image 175. As a result of the modification 195, graphics process 141 receives the change associated with the first image 175. In one embodiment the second graphics editor 196 execute concurrently with graphics process 141 such that the graphics process 141 receives the change 195 in substantially real-time. In an alternate embodiment, the graphics process 141 may execute subsequent to the change 195 made in the second graphics editor 196 such that graphics process 141 receives the change 195 upon its next initial execution.

In sub-step 301, the graphics process 141 maintains a trace object that includes data associated with the first image and data associated with the traced image, as well as a set of current trace parameters reflecting a most recent setting of trace parameters specified by a user. Thus, instead of creating separate files for both the first image and traced image, graphics process 141 maintains a single object that comprises data associated with both the first image and traced image. Furthermore, in order to provide for consistent application of the tracing process 151, the graphics process 141 maintains a set of trace parameters associated with the most recent application of the tracing process 151 in the same object. The trace parameters may include, but are not limited to, path fitting, minimum area, corner angle and the like. As a result, the same trace parameter settings may be applied in subsequent applications of the tracing process 151 so that a user does not have to reset the trace parameters.

In sub-step 302, the graphics process 141 detects, within the trace object, that a modification has been made to at least one of data associated with the first image and data associated with the trace image. More specifically, when the graphics process receives a change associated with the first and/or traced image, the change occurs within the trace object to first and/or traced image, respectively. For example, in one embodiment as shown in FIG. 15, when a user makes a change 195 to a first image 175 in the second graphics editor 196, the trace object associated with the first image and the traced image is also modified. Thus, in this example the graphics process 141 detects the change 195 by way of the trace object associated with the first and traced images.

In sub-step 303, the graphics process 141 detects that a file containing data associated with the first image has been modified by an application that executes separately from an application performing the method of processing image data. In this particular embodiment, the trace object is a file associated with the first image and a change has been made to the first image that modifies the file. Additionally, the modification to the data in the first image file was performed in a separate graphics editor application.

For example, suppose a user applies a trace algorithm to a first image in a first graphics editor that yields a trace object comprising data for both the first image and the traced image. Further assume that subsequent to the application of the trace algorithm to the first image, the user modifies the first image in a second graphics editor. As a result, the modification is recorded in the file associated with the first image. Moreover, the first image file is associated with the trace object also comprising data associated with the traced image. Thus, in this particular embodiment, the graphics process in the first graphics editor detects that a change has been made to the first image by way of the change made to the trace object associated with the first image.

In sub-step 310, in response to receiving the change to the first image, the tracing algorithm is re-applied to the first image accounting for the change to produce a second traced image. In other, after the graphics process 141 detects the change to the first image, the tracing process 151 is re-applied to the first image to produce a second traced image. For example, suppose a user applies a trace algorithm to a first image in a first graphics editor that yields a trace object comprising data for both the first image and the traced image. Further assume that the user modifies the first image in a second graphics editor. As a result, upon detecting this change, the first graphics editor re-applies the tracing algorithm to the modified first image to yield a second traced image. As such, the modified first image and second traced image are maintained in a trace object.

In sub-step 311, in response to receiving the change to the first image, the tracing algorithm is applied with the most recent user setting of trace parameters specified by a user.

Thus, the tracing algorithm is re-applied to the modified first image using the same trace parameter settings as used in the prior application of the trace process 151. For example, suppose a user applies the tracing process 151 to a first image using tracing parameter settings comprising a path fitting value of 2. Thus, if the user subsequently modifies the first image, the tracing process 151 is re-applied to the modified first image using the most recent tracing parameter settings (path fitting value of 2). This feature provides for consistent application of the tracing algorithm so that a user does not have to reset each tracing parameter for each application of the tracing process 151.

Figure 16:
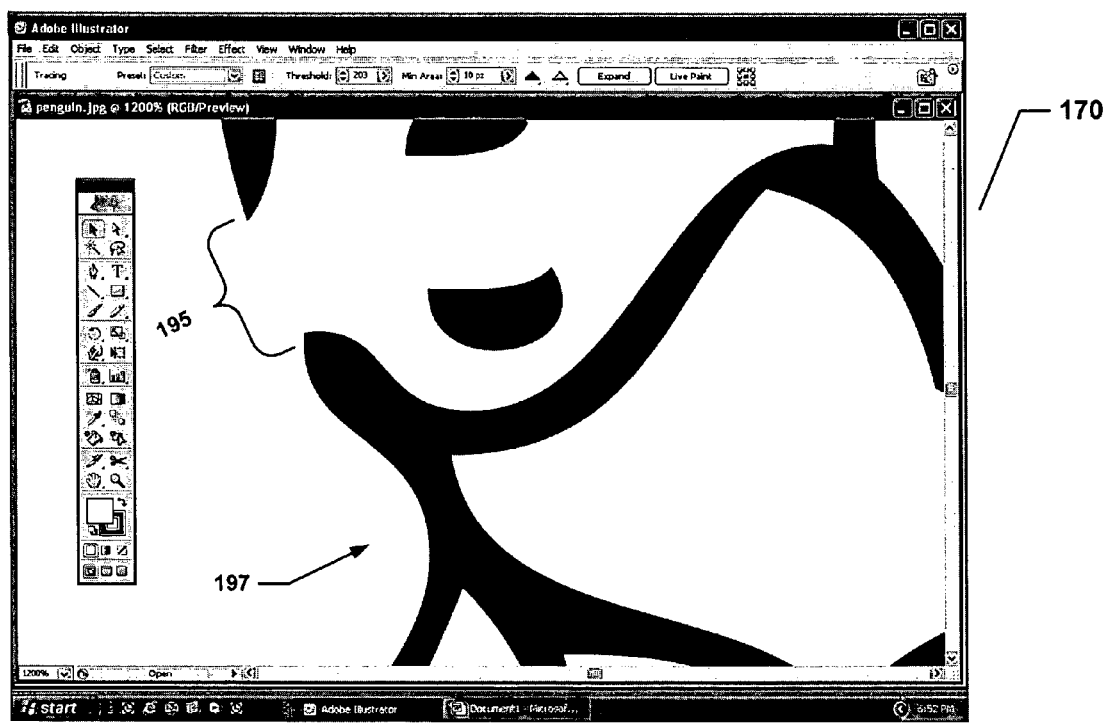
FIG. 16 is a graphical representation that illustrates one implementation of the graphics process and tracing process as a GUI displaying a traced image reflecting the modification to the first image as performed in the second graphics editor.

In sub-step 320, the graphics process 141 re-displays, in an overlapping format, each of the first image and the second traced image. More specifically, after the tracing process 151 has been re-applied to a modified first image, the graphics process 141 re-displays the modified first image and the second traced image in an overlapping format. For example, FIG. 16 shows a second traced image 197 in GUI 170 that was produced by re-applying the tracing algorithm 151 to the modified first image 175 as shown in FIG. 15. In this example, FIG. 16 also shows that the modification 195 to the first image 175 has been replicated in the second traced image 197. Although not depicted in FIG. 16, the second traced image may be viewed concurrently with various configurations of the modified first image as described herein.

Figure 17:
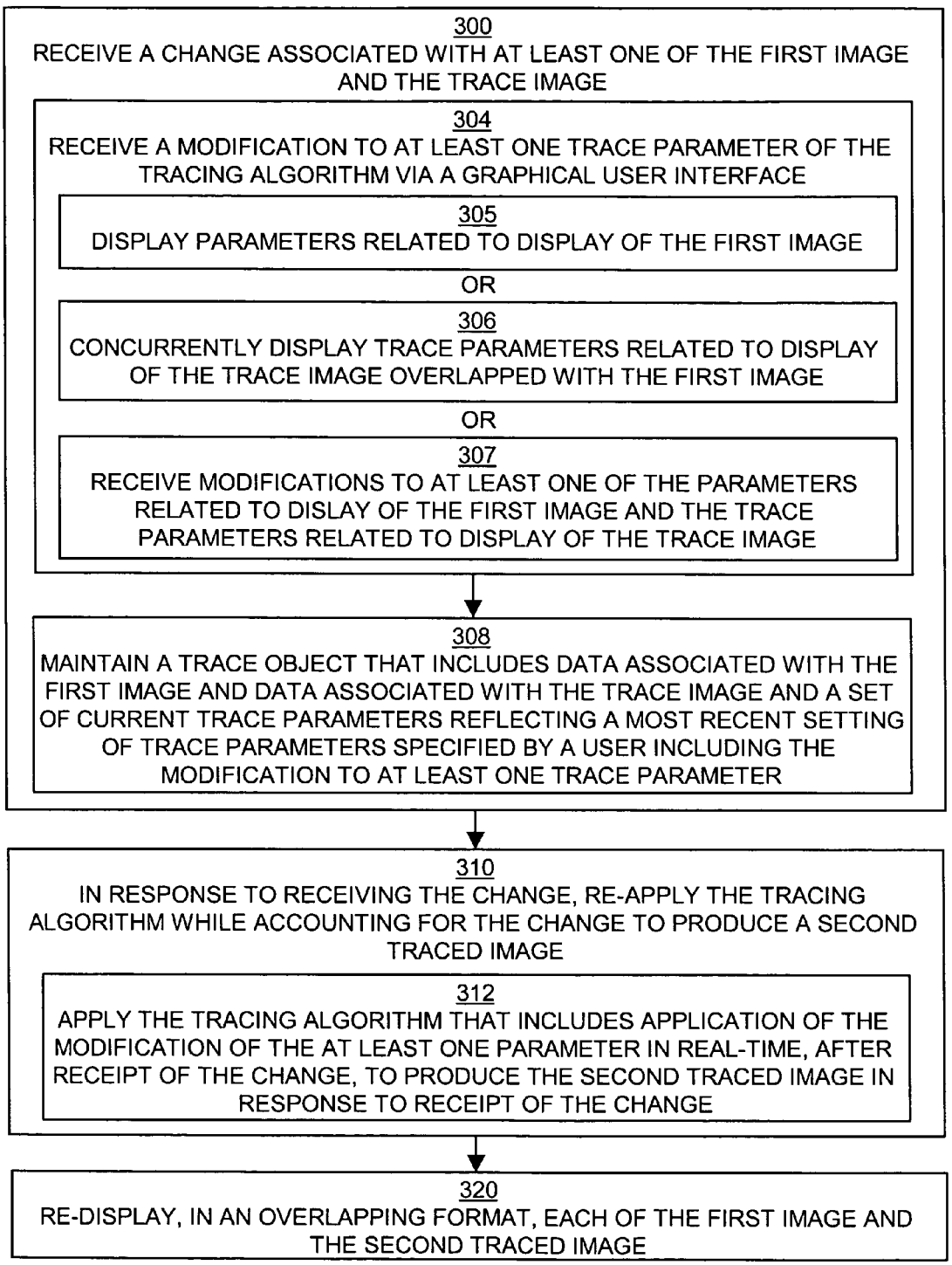
FIG. 17 is a flow chart of processing steps that shows high-level processing operations performed by the graphics process when it receives a change associated with at least one of the first image and the traced image, in accordance with one example configuration of the invention.

FIG. 17 is a flow chart of processing steps that shows certain details of the graphics process 141 when it receives a change associated with at least one of the first image and the traced image in accordance with one example configuration of the invention.

Figure 18:
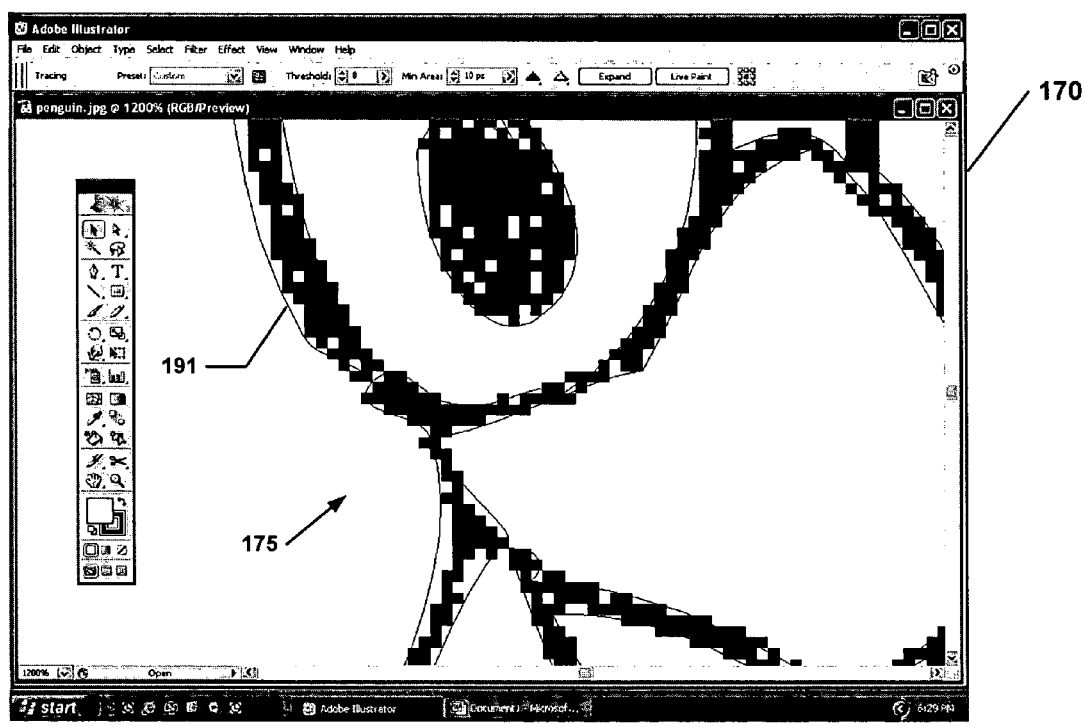
FIG. 18 is a graphical representation that illustrates one implementation of the graphics process and tracing process as a GUI displaying an adjusted configuration of the first image after a modification has been made to at least one parameter of the tracing algorithm.

In sub-step 304, the graphics process 141 receives a modification to at least one trace parameter of the tracing algorithm via a graphical user interface. Thus, in receiving a change to at least one of the first image and traced image, the graphics process 141 receives a change to the traced image in the form of modification to at least one trace parameter. Moreover, the change to the trace parameter was performed via a GUI (separate than the GUI in which the images are displayed) that comprises various trace parameters that may be modified. For example, FIG. 18 shows one embodiment where the graphics process 141 displays a GUI 198 comprising various parameters 199 for the trace algorithm (e.g., path fitting). Additionally, a user modifies at least one parameter in the GUI 198 to a different value than as previously set. As a result, in this particular embodiment the graphics process 141 receives the changed tracing parameter 199 as modified in the GUI 198. It is to be understood that in alternative configurations, tracing parameters can be controlled through a scripting interface as well. In such a configuration, a user could control these tracing parameters programmatically. Thus the statements indicating that a user modifies or control GUI parameters include a program operating to control or adjust such parameters as well.

In sub-step 305, the graphics process displays parameters related to the display of the first image. The parameters related to the display of the first image may include, but are not limited to, threshold values, blur values and the like. These parameters relate to how the first image and the various first image configurations are displayed in the GUI 170. For example, in a particular embodiment the graphics process 141 may display for modification, in addition to the GUI that comprises the images, a GUI 198 that includes a threshold parameter relating to display of the first image. Thus, by modifying the threshold parameter, the adjusted configuration for the first image will likely have a different appearance after the next application of the tracing process 151 to the first image.

In sub-step 306, the graphics process 141 concurrently displays trace parameters related to display of the traced image overlapped with the first image. In this particular embodiment, the trace image parameters are displayed concurrently with the first image parameters such that a user may modify both sets of parameters while viewing a single GUI 198. In another embodiment, the first image parameters and traced image parameters are concurrently displayed, but are displayed in separate graphical user interfaces.

In sub-step 307, the graphics process 141 receives modifications to at least one of the parameters related to the display of the first image and the trace parameters related to the display of the traced image. For example, in one embodiment, as a result of displaying a GUI comprising parameters relating to both the first and traced images, the graphics process 141 receives modifications to a first image parameter (e.g., a threshold value) and a traced image parameter (e.g., a path fitting value) whereby the modifications will be applied in the next application of the tracing process 151.

In sub-step 308, the graphics process 141 maintains a trace object that includes data associated with the first image and data associated with the traced image, as well as a set of current trace parameters reflecting a most recent setting of trace parameters specified by a user including the modification to at least one trace parameter. In other words, in this particular embodiment the trace object as previously described also maintains a modification(s) to at least one trace parameter. Thus, in addition to maintaining data associated with the first and traced images, the trace object also maintains a set of trace parameters that reflect a most recent modification to at least one trace parameter.

For example, assume that a user applies a tracing algorithm to a first image that yields a traced image. Further assume that, after application of the tracing algorithm, the user modifies a threshold parameters relating to the traced image. As a result, in one embodiment the graphics process 141 maintains a trace object comprising, inter alia, the trace parameter settings from the first application of the tracing algorithm reflecting the modification to the threshold parameter. Thus, the trace object maintains the most recent trace parameter settings that may be applied to subsequent applications of the tracing algorithm.

In sub-step 312, in response to receiving the change in at least one trace parameter, the tracing process 151 is applied including the modification of the at least one parameter in real-time to produce the second traced image. More specifically, in response to a user modification to at least one parameter of the tracing algorithm, the tracing process 151 is applied in real-time to produce a second traced image. As such, the second traced image reflects the modification to the traced parameter.

Figure 19:
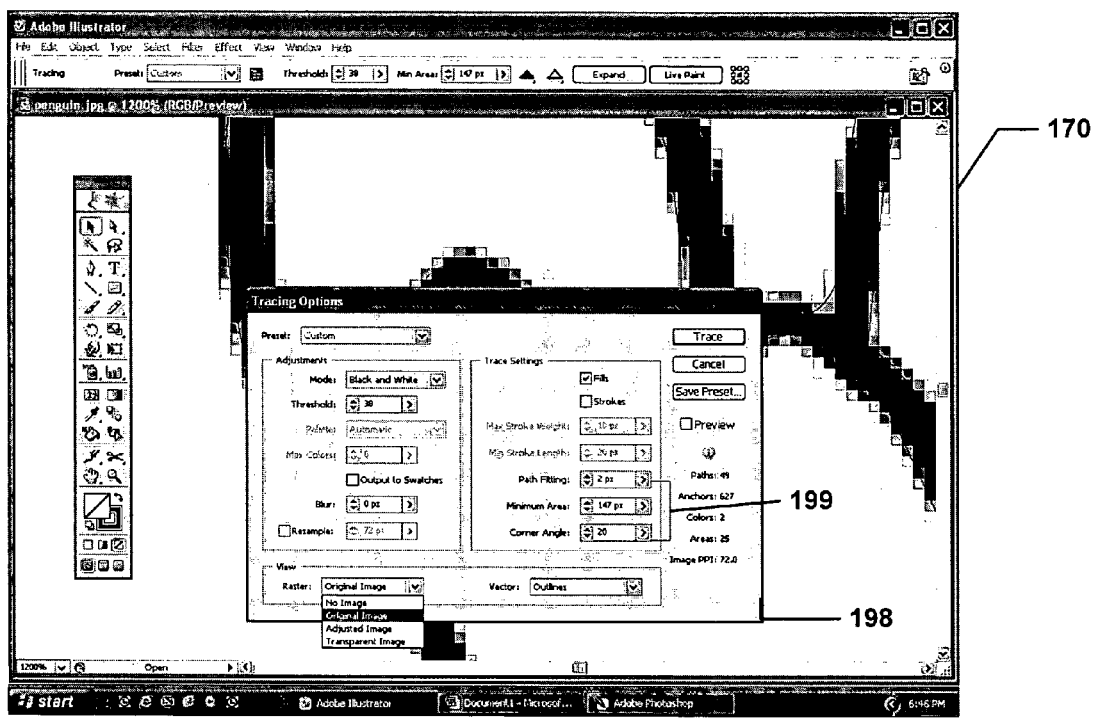
FIG. 19 illustrates an adjusted configuration of the first image after a user modified a threshold parameter.

For example, assume that a user applies a tracing algorithm to a first image that yields a traced image. Further assume that, after application of the tracing algorithm, the user modifies a threshold parameters relating to the traced image. As a result, in one particular embodiment, upon receipt of the modification to the threshold parameter the tracing process 151 is applied in real-time to the first image. FIG. 19 illustrates an adjusted configuration of the first image after a user modified the threshold parameter. After receipt of the change in the threshold parameter, the tracing process 151 was applied in real-time to the first image 175.

While configurations of the system and method have been particularly shown and described with references to configurations thereof, it will be understood by those skilled in the art that various changes in form and details may be made therein without departing from the scope of the invention. Accordingly, the present invention is not intended to be limited by the example configurations provided above.

What is claimed is:

1. A computer readable storage medium responsive to a processor, including computer program logic encoded thereon, that represents an application including a graphics process, that, when executed on a computer system, processes image data by causing the computer system to perform a method for processing image data, the method comprising:

obtaining a first image in a first data format;

applying a tracing algorithm to the first image to produce a trace image of the first image, the trace image maintained in a second data format defining a vector image format; and displaying, in an overlapping format, each of the first image in the first data format and the trace image in the second data format, at least one of the first image and second image displayable in a selectable configuration defining a rendition of that image; wherein displaying, in an overlapping format, each of the first image in the first data format and the trace image in the second data format comprises:

displaying a first image configuration selector indicating a plurality of selectable first image configurations applicable to the first image;

receiving a selection of a first image configuration from the first image configuration selector; and producing a configuration of the first image for displaying in an overlapping format with the trace image, the configuration corresponding to the selection of the first image configuration from the first image configuration selector.

2. The method of claim 1 wherein producing the configuration of the first image comprises at least one of:

identifying that the configuration of the first image is a no-image configuration, and in response, removing the first image from the overlapping format with the trace image;

identifying that the configuration of the first image is an adjusted configuration, and in response, rendering the first image in an adjusted state that displays the first image after application of precondition processing applied to the first image prior to application of the tracing image processing algorithm; and identifying that the configuration of the first image is a transparent configuration, and in response, rendering the first image in a transparent state to be at least partially visible when displayed in the overlapping format.

3. The method of claim 2 wherein displaying, in an overlapping format, each of the first image in the first data format and the second image in the second data format comprises:

displaying a trace image configuration selector indicating a plurality of selectable trace image configurations applicable to the trace image;

receiving a selection of a trace image configuration from the trace image configuration selector; and producing a configuration of the trace image for displaying in an overlapping format with the first image, the configuration corresponding to the selection of the trace image configuration from the trace image configuration selector.

4. The method of claim 3 wherein producing a configuration of the trace image comprises at least one of:

identifying that the configuration of the trace image is a no-image configuration, and in response, removing the trace image from the overlapping format with the first image;

identifying that the configuration of the trace image is an outlined configuration, and in response, rendering the trace image in an outlined state that displays an outline of the trace image from application of the tracing image processing algorithm; and identifying that the configuration of the trace image is a transparent with outlined configuration, and in response, rendering the trace image in a transparent state to be at least partially visible when displayed in the overlapping format and additionally rending the trace image is the outlined state.

5. The method of claim 1 wherein displaying, in an overlapping format, each of the first image in the first data format and the second image in the second data format comprises:

displaying a trace image configuration selector indicating a plurality of selectable trace image configurations applicable to the trace image;

receiving a selection of a trace image configuration from the trace image configuration selector; and producing a configuration of the trace image for displaying in an overlapping format with the first image, the configuration corresponding to the selection of the trace image configuration from the trace image configuration selector.

6. The method of claim 5 wherein producing a configuration of the trace image comprises at least one of:

identifying that the configuration of the trace image is a no-image configuration, and in response, removing the trace image from the overlapping format with the first image;

identifying that the configuration of the trace image is an outlined configuration, and in response, rendering the trace image in an outlined state that displays an outline of the trace image from application of the tracing image processing algorithm; and identifying that the configuration of the trace image is a transparent with outlined configuration, and in response, rendering the trace image in a transparent state to be at least partially visible when displayed in the overlapping format and additionally rending the trace image is the outlined state.

7. The method of claim 1 comprising:

receiving a change associated with at least one of the first image and the trace image;

in response to receiving the change, re-applying the tracing algorithm while accounting for the change to produce a second traced image; and re-displaying, in an overlapping format, each of the first image and the second traced image.

8. The method of claim 7 wherein receiving a change associated with at least one of the first image and the trace image comprises:

maintaining a trace object including data associated with the first image and data associated with the trace image and a set of current trace parameters reflecting a most recent setting of trace parameters specified by a user; and detecting, within the trace object, that a modification has been made to at least one of data associated with the first image and data associated with the trace image; and wherein re-applying the tracing algorithm while accounting for the change to produce a second traced image comprises:

applying the tracing algorithm with the most recent setting of trace parameters specified by a user.

9. The method of claim 8 wherein detecting, within the trace object, that a modification has been made to at least one of data associated with the first image and data associated with the trace image comprises:
   detecting that a file containing the data associated with the first image has been modified by an application that executes separately from an application performing the method of processing image data.

10. The method of claim 1 wherein obtaining a first image in a first data format comprises:
   obtaining a raster image in a raster format; and
   wherein applying a tracing algorithm to the first image to produce a traced image comprises:
   producing a traced image in a vector format; and
   wherein displaying, in an overlapping format, each of the first image in the first data format and the trace image in the second data format comprises:
   displaying the first image in the raster format;
   displaying the trace image in the vector format overlaid on top of the first image in the raster format.

11. A method for processing image data, the method comprising:
   obtaining a first image in a first data format;
   applying a tracing algorithm to the first image to produce a trace image of the first image, the trace image maintained in a second data format; and
   displaying, in an overlapping format, each of the first image in the first data format and the trace image in the second data format, at least one of the first image and second image displayable in a selectable configuration defining a rendition of that image, the first image and the trace image each displayed on a display screen associated with at least one computer device;
   receiving a change associated with at least one of the first image and the trace image;
   in response to receiving the change, re-applying the tracing algorithm while accounting for the change to produce a second traced image; and
   re-displaying, in an overlapping format, each of the first image and the second traced image, wherein receiving a change associated with at least one of the first image and the trace image comprises:
   receiving a modification to at least one trace parameter of the tracing algorithm;
   maintaining a trace object including data associated with the first image and data associated with the trace image and a set of current trace parameters reflecting a most recent setting of trace parameters specified by a user including the modification to at least one trace parameter; and
   and wherein re-applying the tracing algorithm while accounting for the change to produce a second traced image comprises:
   applying the tracing algorithm that includes application of the modification of the at least one parameter in real-time, after receipt of the change, to produce the second traced image in response to receipt of the change.

12. The method of claim 11 wherein receiving a modification to at least one trace parameter of the tracing algorithm via a graphical user interface comprises:
   displaying parameters related to display of the first image;
   concurrently displaying trace parameters related to display of the trace image overlapped with the first image; and
   receiving modifications to at least one of the parameters related to display of the first image and the trace parameters related to display of the trace image.

13. A computer system comprising:
   a memory;
   a processor;
   an interconnection mechanism coupling the memory and the processor allow communication there between;
   wherein the memory is encoded with an application, that when executed in the processor, provides a process that, when executed, obtains a first image in a first data format and produces a traced image when applied to the first image by causing the computer system to perform the operations of:
   obtaining a raster image in a raster format;
   applying a tracing algorithm to the first image to produce a trace image of the first image, the trace image maintained in a second data format defining a vector image format;
   producing a traced image in a vector format;
   displaying, in an overlapping format, each of the first image in the first data format and the traced image in the second data format;
   displaying the first image in the raster format; and
   displaying the traced image in the vector format visually on top of the first image in the raster formats
   wherein applying the tracing algorithm to the first image to produce a trace image of the first image, includes the operations of:
   displaying a first image configuration selector indicating a plurality of selectable first image configurations applicable to the first image;
   receiving a selection of a first image configuration from the first image configuration selector;
   producing a configuration of the first image for displaying in an overlapping format with the trace image, the configuration corresponding to the selection of the first image configuration from the first image configuration selector.

14. The computer system of claim 13 wherein producing the configuration of the first image comprises at least one of:
   identifying that the configuration of the first image is a no-image configuration, and in response, removing the first image from the overlapping format with the trace image;
   identifying that the configuration of the first image is an adjusted configuration, and in response, rendering the first image in an adjusted state that displays the first image after application of precondition processing applied to the first image prior to application of the tracing image processing algorithm; and
   identifying that the configuration of the first image is a transparent configuration, and in response, rendering the first image in a transparent state to be at least partially visible when displayed in the overlapping format.

15. The computer system of claim 13 wherein the process, when executed, causes the computer system to perform the operations of applying a tracing algorithm to the first image to produce a trace image of the first image, the computer system performs the operations of:
   displaying a trace image configuration selector indicating a plurality of selectable trace image configurations applicable to the trace image;
   receiving a selection of a trace image configuration from the trace image configuration selector; and
   producing a configuration of the trace image for displaying in an overlapping format with the first image, the configuration corresponding to the selection of the trace image configuration from the trace image configuration selector.

16. The computer system of claim 15 wherein producing a configuration of the trace image comprises at least one of:
- identifying that the configuration of the trace image is a no-image configuration, and in response, removing the trace image from the overlapping format with the first image;
- identifying that the configuration of the trace image is an outlined configuration, and in response, rendering the trace image in an outlined state that displays an outline of the trace image from application of the tracing image processing algorithm; and
- identifying that the configuration of the trace image is a transparent with outlined configuration, and in response, rendering the trace image in a transparent state to be at least partially visible when displayed in the overlapping format and additionally rending the trace image is the outlined state.

17. The computer system of claim 13 wherein the process, when executed, causes the computer system to perform the operations of receiving a change associated with at least one of the first image and the trace image, the computer system performs the operations of:
- in response to receiving the change, re-applying the tracing algorithm while accounting for the change to produce a second traced image; and
- re-displaying, in an overlapping format, each of the first image and the second traced image; and
- wherein receiving a change associated with at least one of the first image and the trace image comprises:
- maintaining a trace object including data associated with the first image and data associated with the trace image and a set of current trace parameters reflecting a most recent setting of trace parameters specified by a user;
- detecting, within the trace object, that a modification has been made to at least one of data associated with the first image and data associated with the trace image.

18. The computer system of claim 17 wherein re-applying the tracing algorithm while accounting for the change to produce a second traced image comprises:
- applying the tracing algorithm with the most recent setting of trace parameters specified by a user; and
- wherein detecting, within the trace object, that a modification has been made to at least one of data associated with the first image and data associated with the trace image comprises:
- detecting that a file containing the data associated with the first image has been modified by an application that executes separately from an application performing the method of processing image data.

19. The computer system of claim 13 wherein the process, when executed, causes the computer system to perform the operations of receiving a change associated with at least one of the first image and the trace image, the computer system performs the operations of:
- in response to receiving the change, re-applying the tracing algorithm while accounting for the change to produce a second traced image;
- re-displaying, in an overlapping format, each of the first image and the second traced image; and
- wherein receiving a change associated with at least one of the first image and the trace image comprises:
- receiving a modification to at least one trace parameter of the tracing algorithm via a graphical user interface;
- maintaining a trace object including data associated with the first image and data associated with the trace image and a set of current trace parameters reflecting a most recent setting of trace parameters specified by a user including the modification to at least one trace parameter; and
- wherein re-applying the tracing algorithm while accounting for the change to produce a second traced image comprises:
- applying the tracing algorithm that includes application of the modification of the at least one parameter in real-time, after receipt of the change, to produce the second traced image in response to receipt of the change; and
- wherein receiving a modification to at least one trace parameter of the tracing algorithm via a graphical user interface comprises:
- displaying parameters related to display of the first image;
- concurrently displaying trace parameters related to display of the trace image overlapped with the first image; and
- receiving modifications to at least one of the parameters related to display of the first image and the trace parameters related to display of the trace image.

* * * * *

UNITED STATES PATENT AND TRADEMARK OFFICE
CERTIFICATE OF CORRECTION

PATENT NO. : 7,636,097 B1  Page 1 of 1
APPLICATION NO. : 11/354427
DATED : December 22, 2009
INVENTOR(S) : David C. Holloway It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 743 days.

Signed and Sealed this

Ninth Day of November, 2010

David J. Kappos
*Director of the United States Patent and Trademark Office*